United States Patent [19]

Nonaka et al.

[11] Patent Number: 4,837,647

[45] Date of Patent: Jun. 6, 1989

[54] VIDEO CASSETTE AUTO-CHANGER

[75] Inventors: Wataru Nonaka; Eiichi Hirata, both of Kanagawa, Japan

[73] Assignee: Sony Corp., Tokyo, Japan

[21] Appl. No.: 33,459

[22] Filed: Apr. 2, 1987

[30] Foreign Application Priority Data

Apr. 12, 1986 [JP] Japan .................................. 61-84674

[51] Int. Cl.$^4$ ............................................. G11B 15/68
[52] U.S. Cl. ...................................................... 360/92
[58] Field of Search ................... 360/92, 98; 414/280; 198/718, 744

[56] References Cited

U.S. PATENT DOCUMENTS

| | | | |
|---|---|---|---|
| 3,854,604 | 12/1974 | Peterson et al. | 360/92 |
| 4,145,724 | 3/1979 | Medding et al. | 360/92 |
| 4,654,727 | 3/1987 | Blum et al. | 360/92 |

FOREIGN PATENT DOCUMENTS

| | | | |
|---|---|---|---|
| 56-19551 | 2/1981 | Japan | 360/92 |
| 56-80848 | 7/1981 | Japan | 360/92 |
| 60-182050 | 9/1985 | Japan | 360/92 |

*Primary Examiner*—John H. Wolff
*Assistant Examiner*—Matthew J. Bussan
*Attorney, Agent, or Firm*—Alvin Sinderbrand

[57] ABSTRACT

In a video cassette auto-changer which includes a plurality of reproducing and/or recording devices or VTRs, and a plurality of cassette storage bins arrayed in horizontal and vertical directions and each adapted to store a cassette therein; a cassette transporting apparatus for selectively transporting cassettes between the storage bins and the VTRs comprises fixed horizontal upper and lower guide rails along which upper and lower sliders are movable, a movable guide rail extending vertically between the sliders and pivotally connected to the latter at ends of the movable guide rail, a carriage movable vertically along the movable guide rail, a horizontal drive connected with the sliders for moving the carriage in the direction along the fixed guide rails and a vertical drive for moving the carriage along the movable guide rail. Elongated, flexible electrical connecting members or harnesses are provided for applying electrical control signals to horizontally and vertically movable components of the cassette transporting apparatus and are associated with slack take-up devices so that such electrical connecting members can accommodate and will not interfere with substantially vertical and horizontal movements of the carriage.

20 Claims, 17 Drawing Sheets

VIDEO CASSETTE AUTO-CHANGER

BACKGROUND OF THE INVENTION

1. Field of the Invention

This invention relates generally to a video cassette auto-changer, that is, an apparatus for selectively supplying, to a plurality of reproducing and/or recording devices or VTRs, video tape cassettes stored in a large number of respective cassette storage bins.

2. Description of the Prior Art

A video cassette auto-changer has been provided, for example, for use by broadcasting stations, so that a large number of video tape cassettes can be automatically selectively loaded in sequence into a plurality of video tape recorders so as to permit continuous video reproducing and/or recording for an extended time. In a known video cassette auto-changer, a large number of cassette storage bins are arrayed vertically and horizontally in an arrangement of stacks thereof, with a plurality of VTRs disposed at one end of the stack arrangement, and with a cassette transporting device being provided for selectively transporting cassettes between the storage bins and the VTRs. Having in mind the relatively large dimensions of the stack arrangement in orthogonally related directions, for example, in vertical and horizontal directions, the cassette transporting device may comprise a carriage adapted to receive a cassette from, and to discharge a cassette into a selected one of the storage bins VTRs with which the carriage is registered, a movable guide rail extending in one of the orthogonally related directions, for example, vertically, and having a length at least as large as the height of the stack arrangement with the carriage being mounted for vertical movements along the movable guide rail, and fixed guide rails extending in the other orthogonally related direction, that is, horizontally at the top and bottom of the stack arrangement along the length of the latter, with sliders being movable along the fixed guide rails and attached to the ends of the movable guide rail. By effecting movements of the sliders along the fixed guide rails and of the carriage along the movable guide rail, the carriage can be brought into selective registry with the various cassette storage bins and VTRs. However, by reason of the relatively large space occupied by the stack arrangement, it is at least difficult and costly, and in some instances even impossible, to achieve precise parallel alignment of the upper and lower fixed guide rails with the result that the sliders, when rigidly connected to the ends of the movable guide rail for movably mounting the latter on the fixed guide rails, may jam relative to the latter.

Further, in the above-described video cassette auto-changer according to the prior art, it is necessary to transmit electrical control signals or the like over large distances, for example, to the carriage as the latter is moved over relatively large vertical and horizontal distances for selectively registering with any one of the large number of cassette storage bins or the plurality of VTRs. For this purpose, it has been proposed to employ an elastically coiled electrical cord for transmitting the electrical control or driving signals to the movable carriage or the like, with the intention that the elastically coiled cord will be automatically extended and contracted in accordance with movements of the carriage away from and toward, respectively, a fixed terminus or receptacle from with the coiled cord extends. Alternatively, it has been proposed to use a flat, flexibly resilient cable as the electrical connecting member and to increase the inherent resiliency of the flat cable by mounting a leaf spring therealong as a guide member to prevent entangling of the cable in adjacent structures during movements of the carriage. As still another possible arrangement of the electrical connecting member, it has been proposed to employ therefor a cable inserted, for at least part of its length, in a resiliently flexible tube which tends to keep the cable straight, but which can be resiliently bent up to approximately a 180° turn for accommodating movements of the carriage. However, the foregoing schemes for controlling and preventing snagging of the electrical connecting member are all burdened with respective disadvantages. When an elastically coiled electric cord is used, the maximum length of the extended cord is about three times its minimum or contracted length. Thus, the elastically coiled cord, even when fully contracted, takes up more space than is desired. Similarly, when a flat, flexibly resilient cable is employed either alone or with a leaf spring or the like mounted along the cable to increase its resiliency, or when the cable is inserted in a resilient tube, undesirably large spaces are required for such arrangements particularly when large movements of the carriage are to be effected and sharp bends in the cable are to be avoided.

OBJECTS AND SUMMARY OF THE INVENTION

Accordingly, it is an object of this invention to provide a video cassette auto-changer which avoids the above-mentioned problems associated with the prior art.

More specifically, it is an object of this invention to provide a video cassette auto-changer which includes a plurality of VTRs, a large number of cassette storage bins arrayed in first and second orthogonally related directions and each adapted to store a cassette therein, and a cassette transporting device for selectively transporting cassettes over large distances between the storage bins and the VTRs without jamming or otherwise interrupting the rapid and smooth transfer of the cassettes.

Another object of the invention is to provide a video cassette auto-changer, as aforesaid, with a compact and reliably effective arrangement for transmitting electrical control or drive signals to movable elements of the cassette transporting device.

In accordance with an aspect of this invention, in a video cassette auto-changer which includes a plurality of reproducing and/or recording means, such as, VTRs, and a large number of cassette storage bins arrayed in first and second orthogonally related directions, for example, in horizontal and vertical directions, and each adapted to store a cassette therein; a cassette transporting means for selectively transporting cassettes between the storage bins and between the storage bins and the VTRs comprises fixed guide rail means extending in the first direction, slider means mounted on the fixed guide rail means for movement along the latter in the first direction, slider driving means for driving the slider means along the fixed guide rail means, movable guide rail means extending in the second direction, connecting means pivotally connecting the movable guide rail means to the slider means for movement with the latter along the fixed guide rail means and for pivoting in respect to the slider means in a plane containing the first and second orthogonally related directions, carriage means mounted on the movable guide rail means for movement along the latter in the second direction and being adapted to receive a cassette from, and to discharge a cassette into a selected one of the storage bins or VTRs with which the carriage means is registered, and carriage driving means for driving the carriage along the movable guide rail means so that, by the combined selective operations of the slider driving means and the carriage driving means, the carriage means can be registered with the selected one of the storage bins and VTRs.

In accordance with another aspect of this invention, in a video cassette auto-changer which includes a plurality of VTRs, a large number of cassette storage bins arrayed in first and second orthogonally related directions and each adapted to store a cassette therein, and cassette transporting means movable in the first and second directions for selectively transporting cassettes between the storage bins and the VTRs; there is provided the combination of an elongated, flexible electrical connecting member extending from a fixed source of electrical control or drive signals to the cassette transporting means and being of a length to permit movements of the latter in the first direction, first movable roller means around which the electrical connecting member extends to form a bight in the latter, means mounting the first movable roller means for movements in said first direction, second movable roller means mounted for reciprocable movements in a path perpendicular to the axis of the second roller means and which is preferably parallel to said first direction, a first elongated, flexible mechanical connection connected at one end to the cassette transporting means and at its other end to a stationary anchor and extending around the second movable roller means intermediate such ends of the first flexible mechanical connection for moving the second movable roller means in said path in response to movements of the cassette transporting means in the first direction, and a second elongated, flexible mechanical connection extending between the first and second movable roller means for moving the first roller means in the first direction in response to movements of the second roller means in said path thereof so as to avoid slackness in the bight of the electrical connecting member.

In accordance with still another aspect of the invention, in a video cassette auto-changer which includes a plurality of VTRs, a large number of cassette storage bins arrayed in horizontal and vertical directions and each adapted to store a cassette therein, and cassette transporting means for selectively transporting cassettes between the storage bins and VTRs; said cassette transporting means comprises horizontally extending upper and lower fixed guide rails which are vertically spaced apart, upper and lower slider members movable along the upper and lower fixed guide rails, respectively, slider driving means for driving the upper and lower slider members along the fixed guide rails, movable guide rail means extending vertically between the upper and lower slider members, carriage means mounted on the movable guide rail means for vertical movement along the latter and being adapted to receive a cassette from, and to discharge a cassette into a selected one of the storage bins or VTRs with which the carriage means is registered, an elongated flexible electrical connecting member extending from the upper slider member to the carriage means for supplying electrical control signals to the latter and having a length sufficient to accommodate the movement of the carriage means along the movable guide rail means, movable roller means under which the electrical connecting member extends for forming a bight in the latter, and means guiding the movable roller means for movements along the movable guide rail means under the influence of gravity so that the weight of the movable roller means acts to take up slack in the electrical connecting member.

The above, and other objects, features and advantages of the invention, will be apparent in the following detailed description of an illustrative embodiment thereof which is to be read in connection with the accompanying drawings in which corresponding parts are identified by the same reference numerals in the several views.

DESCRIPTION OF A PREFERRED EMBODIMENT

Figure 1:
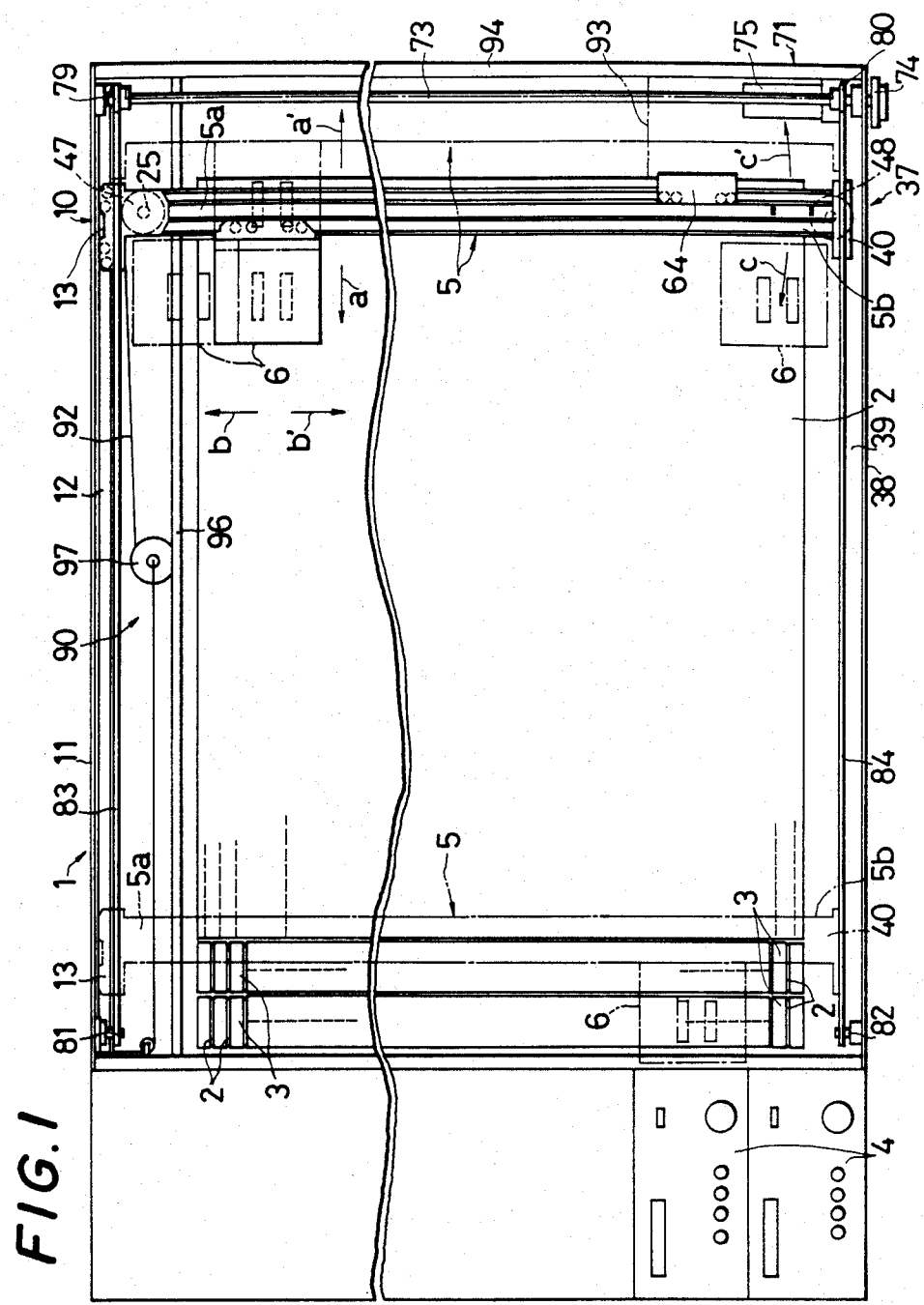
FIG. 1 is front elevational view of a video cassette auto-changer in accordance with an embodiment of the present invention.
Figure 2:
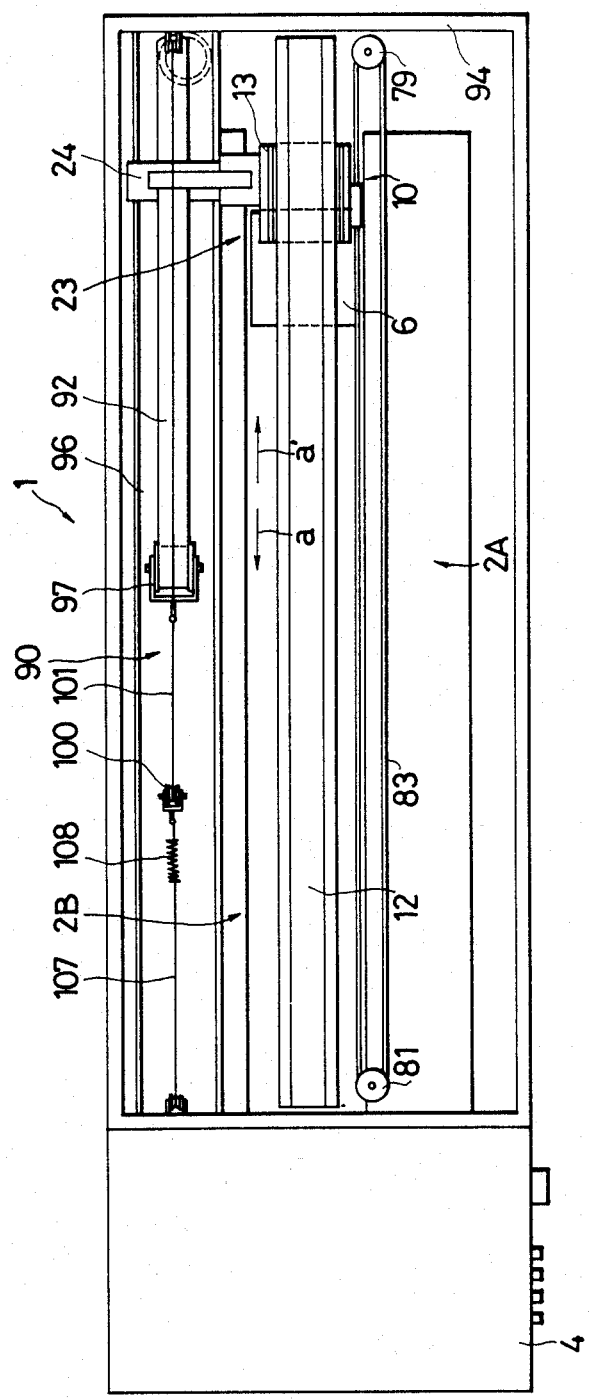
FIG. 2 is a top plan view of the video cassette auto-changer shown on FIG. 1.
Figure 3:
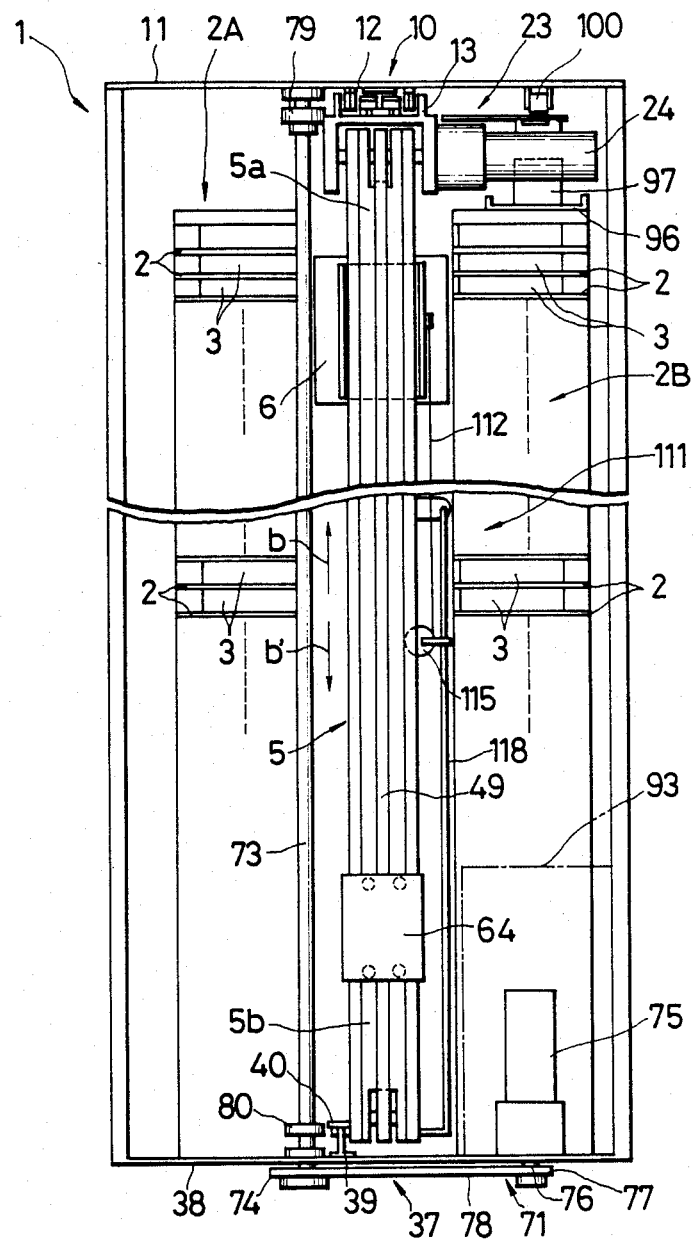
FIG. 3 is a side elevational view of the video cassette auto-changer of FIGS. 1 and 2.

Referring to the drawings in detail, and initially to FIGS. 1-3 thereof, it will be seen that a video cassette auto-changer according to an embodiment of this invention generally comprises an upright, rectangular housing 1 having a large number of cassette storage bins 2 arrayed therein in orthogonally related directions, that is, in vertical stacks which are arranged horizontally in succession, and which are each adapted to store a video tape cassette 3 therein. Further, as is apparent in FIGS. 2 and 3, the stacks of storage bins 2 are arranged in front and rear banks 2A and 2B that are spaced apart to define an aisle therebetween. A plurality of reproducing and/or recording devices, such as, VTRs 4, are stacked vertically one above the other at one side of the housing 1, and are of a so-called side-loading type so as to be each capable of receiving a cassette 3 at the side of the respective VTR 4 facing the aisle between the banks 2A and 2B of storage bins 2. A movable guide rail 5 extends vertically in the aisle between the front and rear banks 2A and 2B of storage bins 2 and is movable horizontally in the directions of the arrows a and a' on FIG. 1, as hereinafter described in detail. A cassette feeder or carriage 6 is mounted on guide rail 5 for movements vertically along the latter in the directions indicated by the arrows b and b' on FIG. 1, as hereinafter described in detail.

In the operation of the above generally described video cassette auto-changer, a selected cassette 3 is removed by cassette feeder or carriage 6 from a respective cassette storage bin 2, whereupon carriage 6 is moved horizontally in the direction of the arrow a and vertically in the direction of the arrow b or b' so as to register with the side-loading port or opening of a selected one of the VTRs 4, and the transported cassette 3 is then transferred from carriage 6 into the selected VTR 4 for reproducing or recording a signal on the tape in such selected cassette. After the desired recording or reproducing operation has been performed in the selected VTR 4, the used cassette 3 is removed by cassette feeder or carriage 6 which is then moved horizontally in the direction of the arrow a' and vertically in the direction of the arrow b or b' for registering carriage 6 with the storage bin 2 into which the used cassette 3 is to be returned. Then, the returned cassette 3 is transferred from carriage 6 to the cassette storage bin 2 with which it is registered.

A supporting structure 10 for the upper end portion 5a of vertical guide rail 5 is shown to generally include a substantially horizontal top plate 11 of housing 1 to the underside of which there is suitably secured a substantially horizontal upper guide rail 12, and an upper slider mechanism 13 mounted on upper guide rail 12 for movements therealong in the directions of the arrow a and a'.

The horizontal upper guide rail 12 is shown, particularly on FIG. 2, to be disposed above the aisle 2. As shown on FIG. 4, guide rail 12 is substantially comprised of two oppositely facing C-shaped sections 12a and 12b connected by a horizontal web 12c from which a central web 16 depends.

The slider mechanism 13 includes a horizontal plate 14 with flanges 17a and 17b directed upwardly along the front and rear portions of plate 14. Front and rear guide rollers 15 are mounted on the opposite side portions of plate 14 midway between flanges 17a and 17b for rotation about respective vertical axes and are positioned for close rolling engagement with the opposite side surfaces of flange 16 of guide rail 12. Two inner guide rollers 18a and two outer guide rollers 18b are mounted at the rearwardly facing side of flange 17a and at the forwardly facing side of flange 17b and are rotatable about respective horizontal axes. The rollers 18a and 18b on flange 17a extend into a forwardly opening horizontal guide groove 19a defined by section 12a of guide rail 12, while the rollers 18a and 18b mounted on flange 17b similarly extend into a rearwardly opening horizontal guide groove 19b defined by section 12b of guide rail 12. As shown particularly on FIG. 5, the axes of the inner rollers 18a are disposed slightly higher than the axes of the outer rollers 18b with the result that guide rollers 18a are in rolling contact with the downwardly facing upper surfaces of the respective guide grooves 19a and 19b, while guide rollers 18b are in rolling contact with the upwardly facing lower surfaces of the respective guide grooves 19a and 19b. By reason of the foregoing, the slider mechanism 13 is smoothly guided by rollers 15,18a and 18b for movements along the horizontal upper guide rail 12 in the horizontal directions indicated by arrows a and a'.

Front and rear support plates 20 and 21 (FIGS. 4 and 7) depend from the front and back edge portions of horizontal plate 14 and are fixed to the latter by bolts 22. A vertical drive mechanism 23 which will be described in detail hereinafter generally comprises a geared motor 24 fixed to the back surface of support plate 21 and having a drive shaft 25 which extends through support plate 21 and is supported at its forward end in a bearing 26 (FIG. 7) carried by front support plate 20.

A pair of bearings 30 and 31 (FIG. 7), which may be in the form of ball bearings, are fixed to the upper end portion 5a of vertical guide rail 5 at the inner side surfaces of front and rear walls 28 and 29 of a box-like structure forming guide rail 5. Driving shaft 25 is inserted in bearings 30 and 31 with the result that the upper end portion 5a of vertical guide rail 5 is pivotally suspended from driving shaft 25, and hence is mounted on slider mechanism 13 for movements with the latter along horizontal upper guide rail 12 and for pivotal movements relative to slider mechanism 13 about the axis of shaft 25. As shown on FIG. 7, spaces or clearances 34 having a width w are provided between the upper end portion 5a of vertical guide rail 5 and support plates 20 and 21, respectively.

Figure 4:
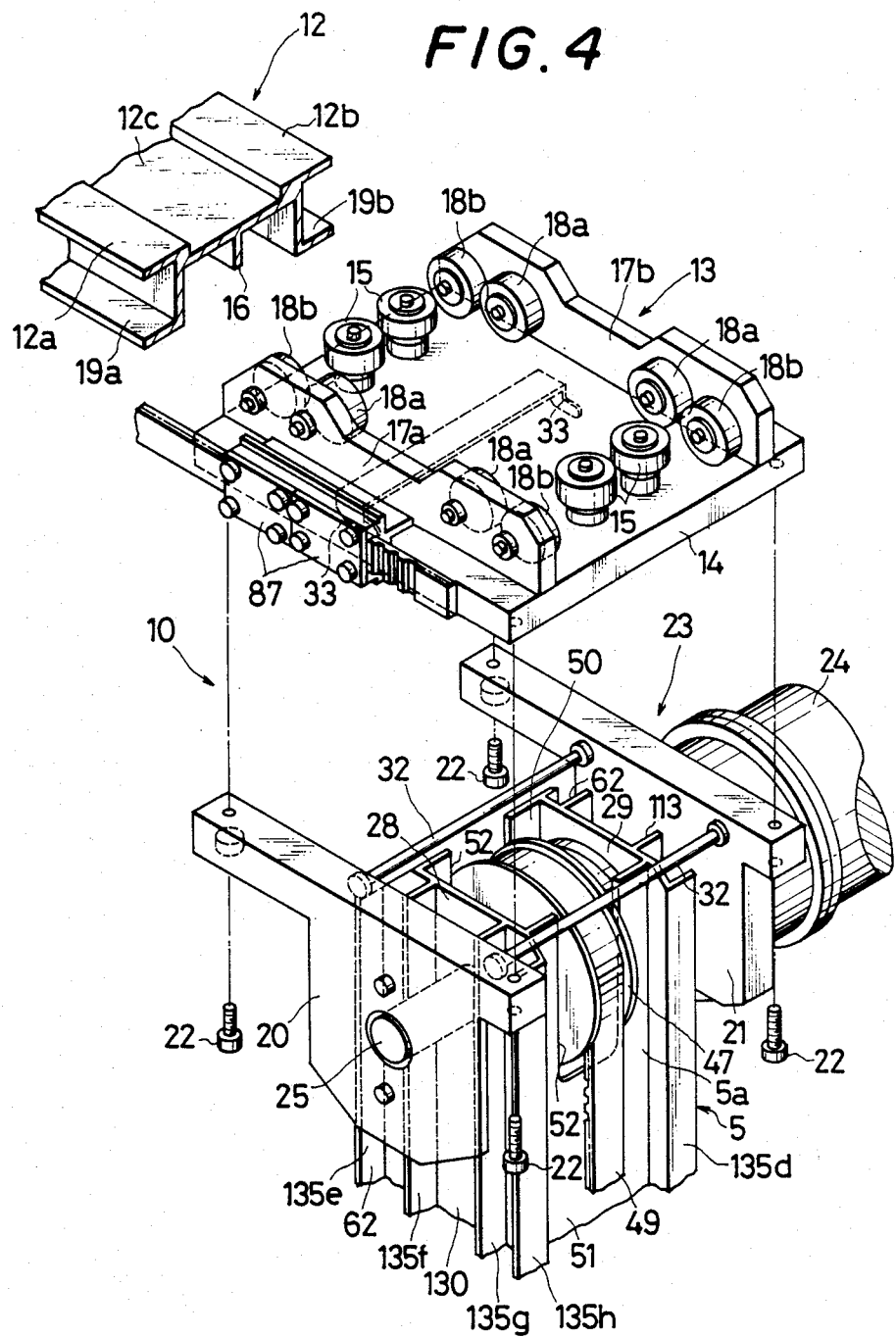
FIG. 4 is an enlarged, exploded perspective view of the mechanism for movably supporting the upper end of a vertical guide rail included in the apparatus of FIGS. 1-3.
Figure 8:
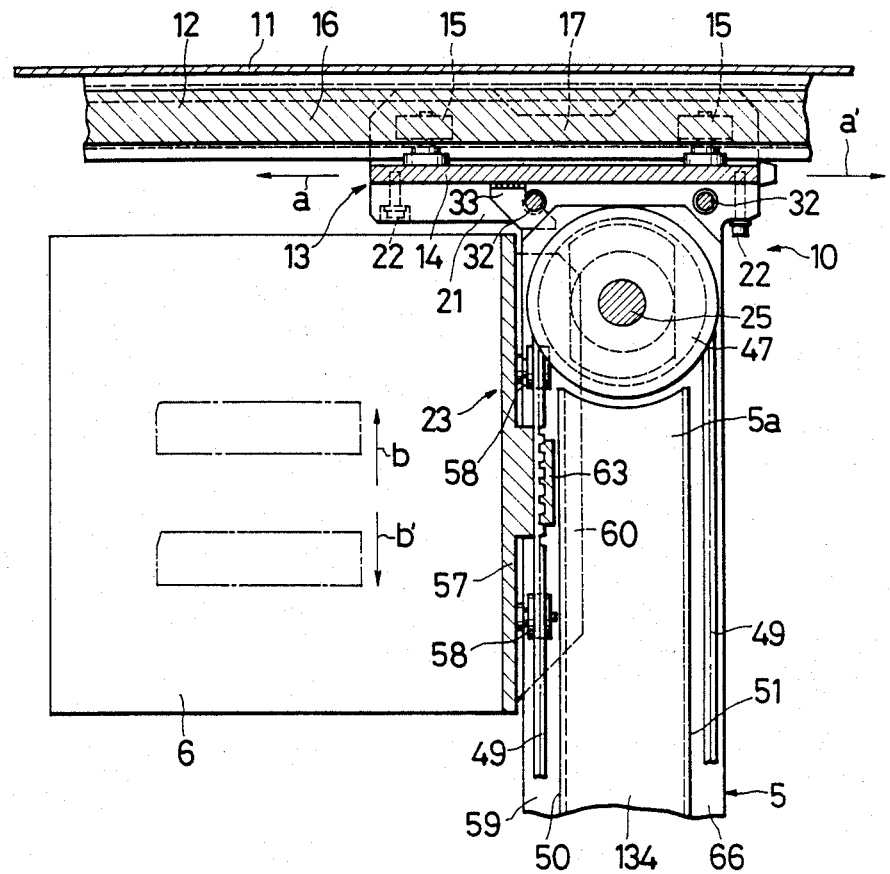
FIG. 8 is a sectional view taken along the line VIII—VIII on FIG. 7.

In order to facilitate the suspension of vertical guide rail 5 from slider mechanism 13, upper end portion 5a of the guide rail is initially mounted on driving shaft 25 at a time when support plates 20 and 21 are disconnected from horizontal plate 14, as shown on FIG. 4. At such time, support plates 20 and 21 can be secured to each other by a pair of left and right connecting rods 32. Thereafter, one of the connecting rods 32 is engaged with a hook bracket 33 secured to the undersurface of plate 14, as shown on FIG. 8, for temporarily suspending vertical guide rail 5 from slider mechanism 13 until bolts 22 can be installed for securing support plates 20 and 21 to horizontal plate 14.

Returning to FIGS. 1 and 3, it will be seen that a support mechanism 37 for a lower end portion 5b of vertical guide rail 5 generally comprises a bottom plate 38 extending along housing 1, a horizontal lower guide rail 39 fixed to the upper surface of bottom plate 38 under the aisle between the banks 2A and 2B of cassette storage bins 2, and a lower slider mechanism 40 movable along lower horizontal guide rail 39 in the directions of the arrows a and a'. As shown particularly on FIGS. 9 and 11, lower horizontal guide rail 39 is desirably of inverted T-shaped cross-section so as to define a vertical, upwardly directed rib 43 extending along guide rail 39 and being received between two pairs of front and rear guide rollers 42 depending from a horizontal plate 41 of slider mechanism 40 at laterally spaced apart positions and being rotatable about respective vertical axes. Guide rollers 42 are adapted to guide slider mechanism 40 along guide rail 39 while permitting vertical movements of slider mechanism 40 relative to guide rail 39.

Figure 9:
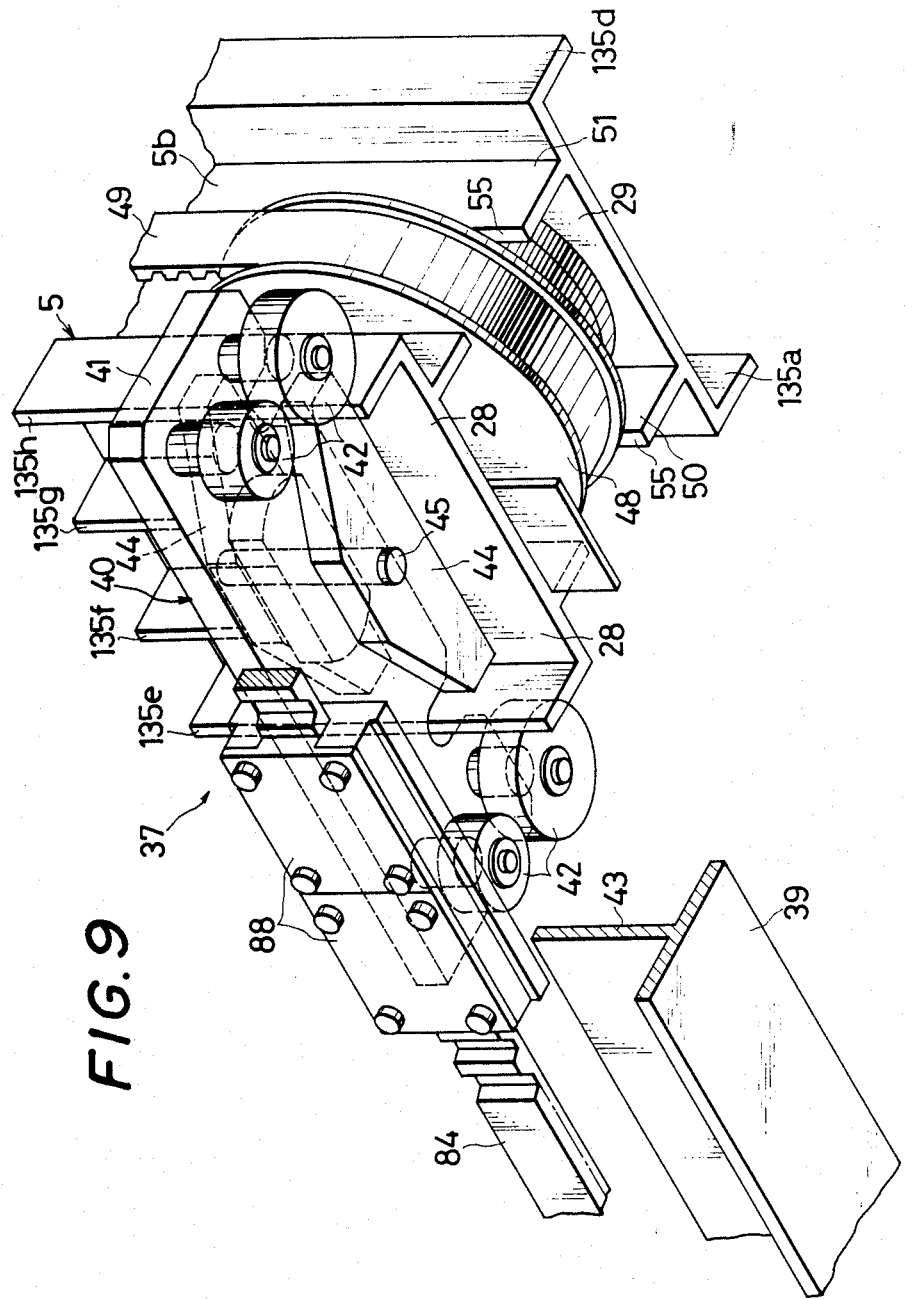
FIG. 9 is an enlarged perspective view of the mechanism for mounting the lower end portion of the vertical guide rail in respect to a lower fixed guide rail in the apparatus of FIGS. 1-3.
Figure 10:
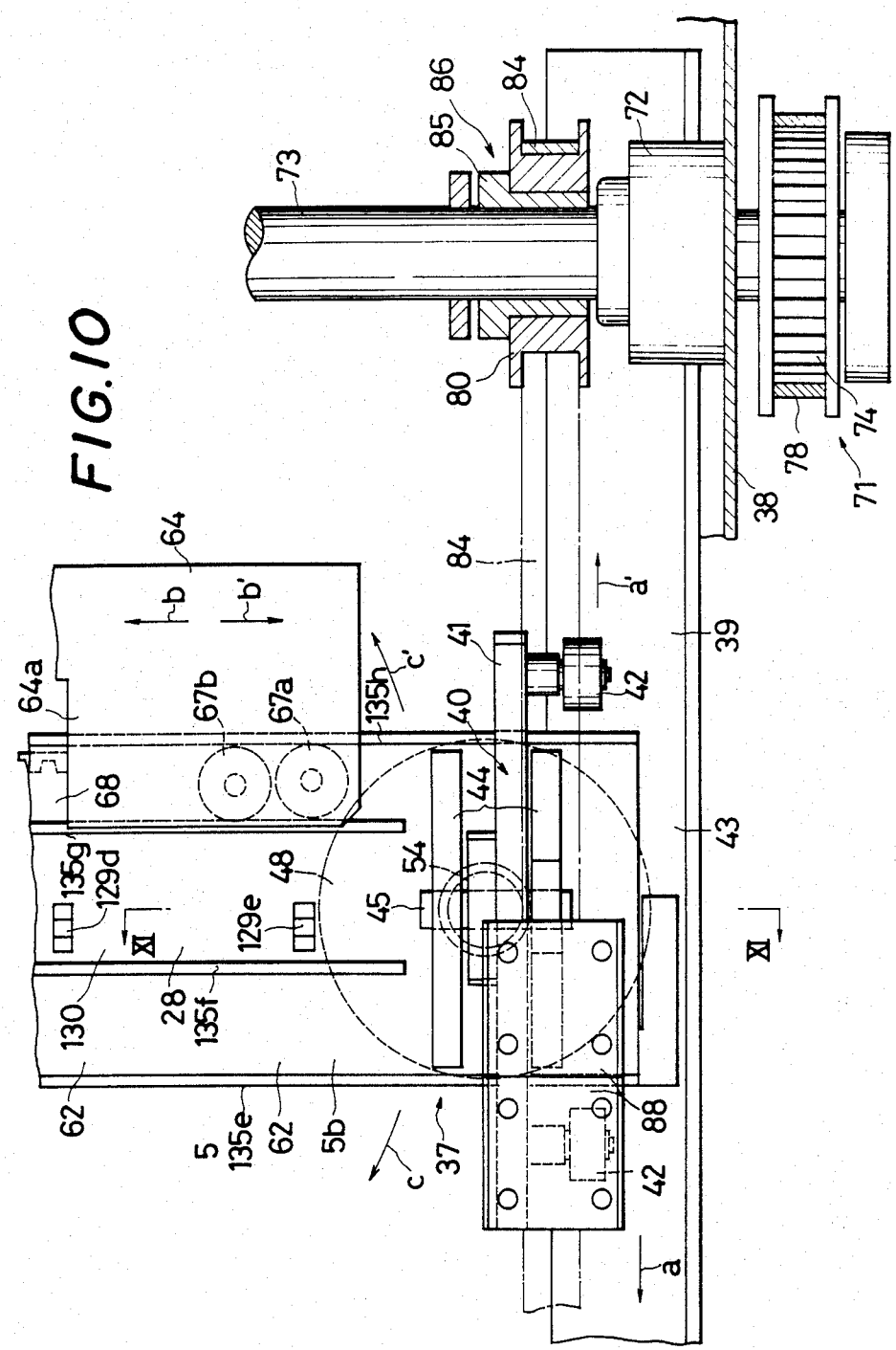
FIG. 10 is a fragmentary front elevational view of the mechanism shown in FIG. 9.
Figure 11:
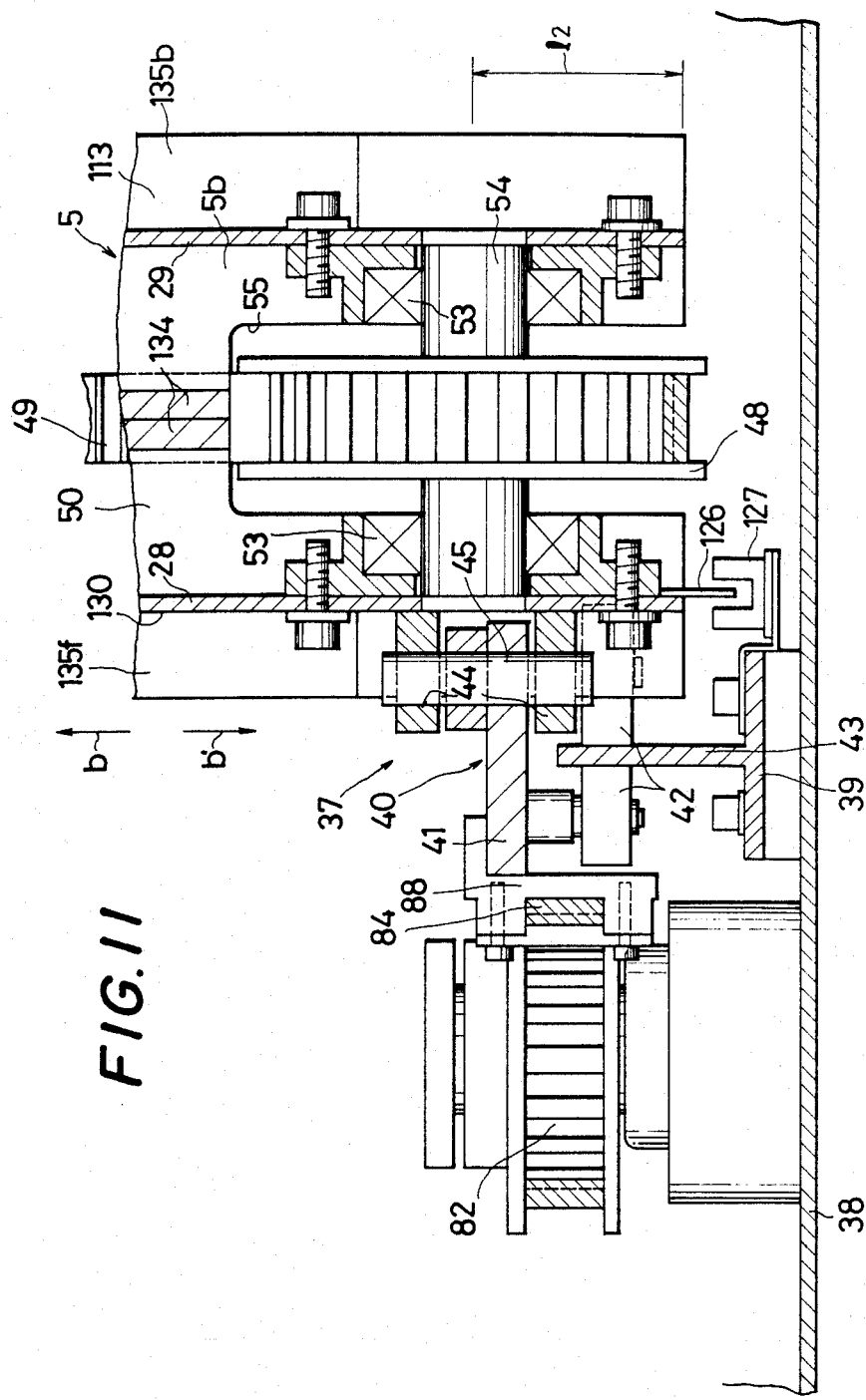
FIG. 11 is a sectional view taken along the line XI—XI on FIG. 10.

As shown on FIGS. 9–11, a pair of vertically spaced flange members 44 are directed forwardly from the front wall 28 of guide rail 5 at the lower end portion 5b of the latter. The horizontal plate 41 of slider mechanism 40 extends rearwardly between flange members 44 and is pivotally connected to the latter by a vertical pivot pin 45. Therefore, lower slider mechanism 40, in moving along guide rail 39, is free to be angularly displaced about the vertical axis of pin 45 relative to vertical guide rail 5 for accommodating any deviations of the upwardly directed flange 43 of guide rail 39 from a plane parallel to the plane of the central web 16 of upper guide rail 12. Furthermore, since slider mechanism 40 is free to be displaced vertically in respect to lower guide rail 39, guide rail 5 is swingable about the horizontal axis of driving shaft 25 from which it is suspended, at the upper end, in which case the lower end portion 5b of guide rail 5 is displaceable in the directions indicated by the arrows c and c' on FIG. 10.

Figure 12:
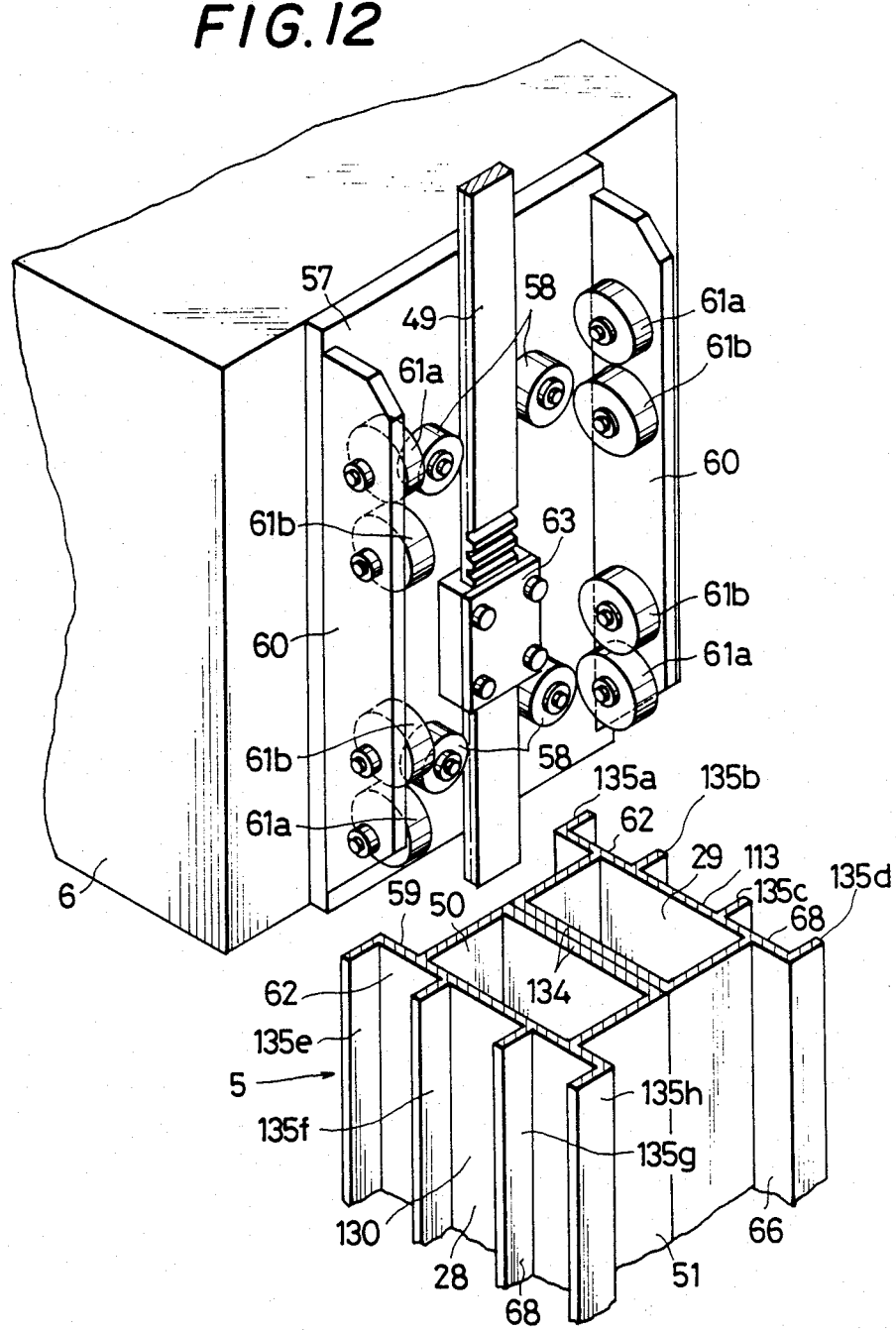
FIG. 12 is an exploded perspective view showing details of the vertical guide rail and of the mechanism for movably mounting a carriage thereon in the apparatus of FIGS. 1-3.
Figure 13:
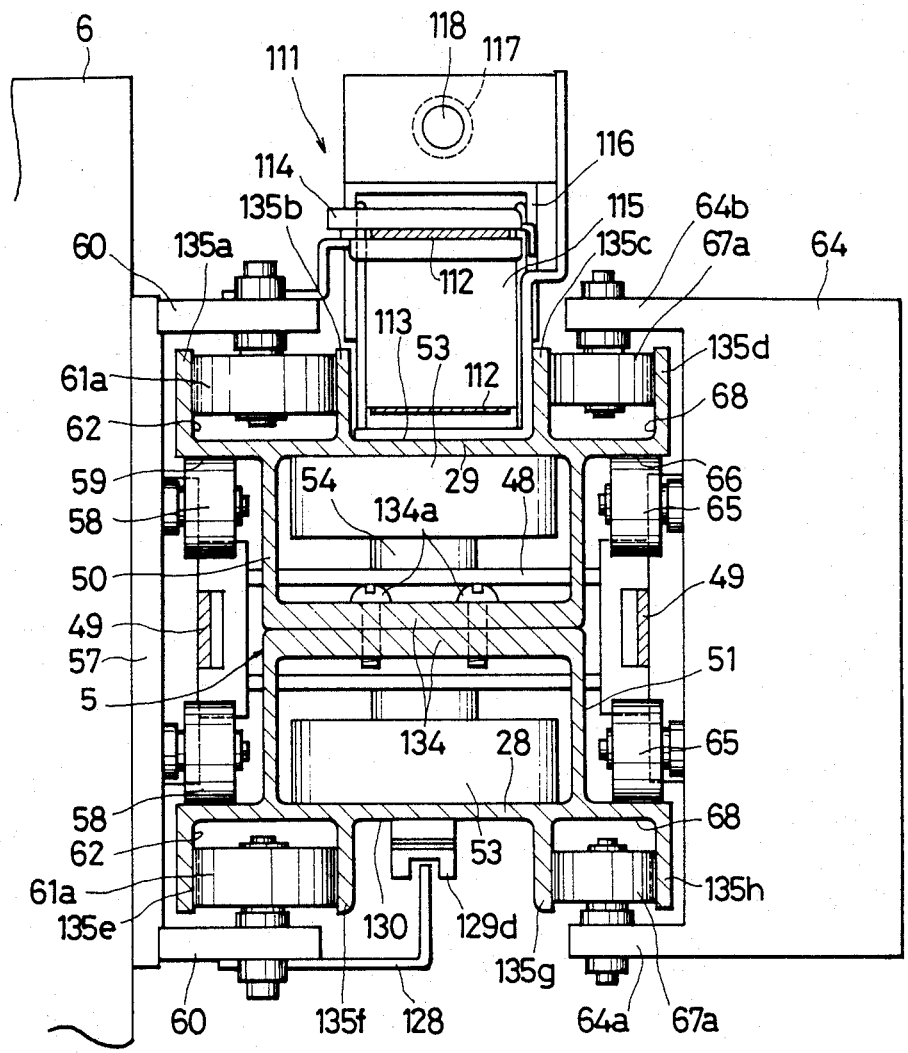
FIG. 13 is an enlarged sectional view taken along the line XIII—XIII on FIG. 5.

As shown particularly on FIGS. 12 and 13, a mounting plate 57 is fixed to the side surface of cassette feeder or carriage 6 facing away from the stack of VTRs 4, and upper and lower pairs of guide rollers 58 are mounted on plate 57 for rotation about respective horizontal axes and are engageable in a guide groove 59 extending vertically along the adjacent side of guide rail 5. For convenience in fabricating and assembling guide rail 5 with carriage 6, the box-like structure of guide rail 5 is shown to be formed in two portions having rectangular sections and being secured together at abutting walls 134 by screws 134a (FIG. 13) so as to define the previously mentioned front and rear walls 28 and 29 and side walls 50 and 51 extending therebetween. Side portions of front and rear walls 28 and 29 are shown to extend laterally beyond side walls 50 and 51, so as to define the previously mentioned guide groove 59 by means of the outer surface of side wall 50 and the confronting or inwardly directed surfaces of the projecting side portions of front and rear walls 28 and 29. A similar guide groove 66 is provided at the opposite side of guide rail 5 by the outer surface of side wall 51 and the confronting or inwardly directed surfaces at the respective projecting side portions of front and rear walls 28 and 29. Spaced apart vertical ribs 135a, 135b, 135c and 135d extend rearwardly from rear wall 29, and spaced apart vertical ribs 135e, 135f, 135g and 135h extend forwardly from front wall 28. Guide grooves 62 are defined between ribs 135a and 135b and ribs 135e and 135f, respectively. Flanges 60 extend laterally from the forward and rearward edge portions of mounting plate 57, and pairs of guide rollers 61a and 61b are mounted at the inner surfaces of flanges 60 at upper and lower positions, respectively, for rotation about horizontal axes. Such guide rollers 61a and 61b extend into guide grooves 62 and, as shown particularly on FIG. 5, the axes of guide rollers 61a are offset laterally in respect to the axes of guide rollers 61b. Thus, guide rollers 61a are in rolling contact with rib 135a at one side of vertical guide rail 5 and with rib 135e at the opposite side of guide rail 5, while guide rollers 61b are in rolling contact with the rib 135b or the rib 135f. Therefore, mounting plate 57 and the cassette feeder or carriage 6 thereon can be smoothly moved along vertical guide rail 5 with displacements relative to the latter only in the vertical direction, that is, the direction along the longitudinal axis of guide rail 5.

As shown on FIGS. 10 and 13, a counter weight 64 is mounted on vertical guide rail 5 at the side of the latter remote from cassette feeder or carriage 6. Upper and lower, and front and rear guide rollers 65 are mounted on counter weight 64 for rotation about horizontal axes and are positioned to extend into vertical guide groove 66 defined by side wall 51 of guide rail 5 and by the edge portions of front and rear walls 28 and 29 projecting beyond side wall 51 and with which guide rollers 65 are in rolling contact. The counter weight 64 has front and rear flanges 64a and 64b extending therefrom past ribs 135h and 135d, respectively, of vertical guide rail 5 (FIG. 13). Upper and lower pairs of guide rollers 67a and 67b (FIGS. 10 and 13) extend from flanges 64a and 64b into guide grooves 68 defined between ribs 135g and 135h and between ribs 135c and 135d, respectively. As shown on FIG. 10, the horizontal axes of rotation of guide rollers 67a are offset laterally a small distance relative to the horizontal axes of rotation of guide rollers 67b so that guide rollers 67a effect rolling contact with the rib at one side of guide groove 68, for example, the rib 135h on FIG. 10, while guide rollers 67b effect rolling contact with the rib 135g at the opposite side of the respective guide groove 68. Thus, counter weight 64 is also mounted for smooth movements in the directions of the arrows b and b' along vertical guide rail 5.

The vertical drive mechanism 23 is provided to effect the controlled vertical movements of cassette feeder or carriage 6 in the direction of the arrows b and b' along vertical guide rail 5. As shown particularly on FIGS. 4 and 7, vertical drive mechanism 23 includes, in addition to the previously mentioned motor 24, a toothed driving pulley 47 fixed to motor shaft 25 and located in a generally U-shaped cutout 52 formed in side walls 50 and 51 at upper end portion 5a of vertical guide rail 5. As shown particularly in FIG. 11, bearings 53, which may be in the form of ball bearings, are fixed to the inner sides of front and rear walls 28 and 29 of guide rail 5 at the lower end of the latter, and a driven shaft 54 is rotatably mounted in such bearings 53. A toothed driven pulley 48 is fixed on driven shaft 54 and is accommodated in a U-shaped cutout 55 formed in the lower portions of side walls 50 and 51 of guide rail 5. A timing belt 49 extends around pulleys 47 and 48, and runs of belt 49 between pulleys 47 and 48 are disposed centrally in grooves 59 and 66, respectively, of guide rail 5. The run of timing belt 49 in guide groove 59 is secured by a clamp 63 to mounting plate 57 of cassette feeder or carriage 6, and counter weight 64 is similarly secured to the run of timing belt 49 in guide groove 66.

Figure 5:
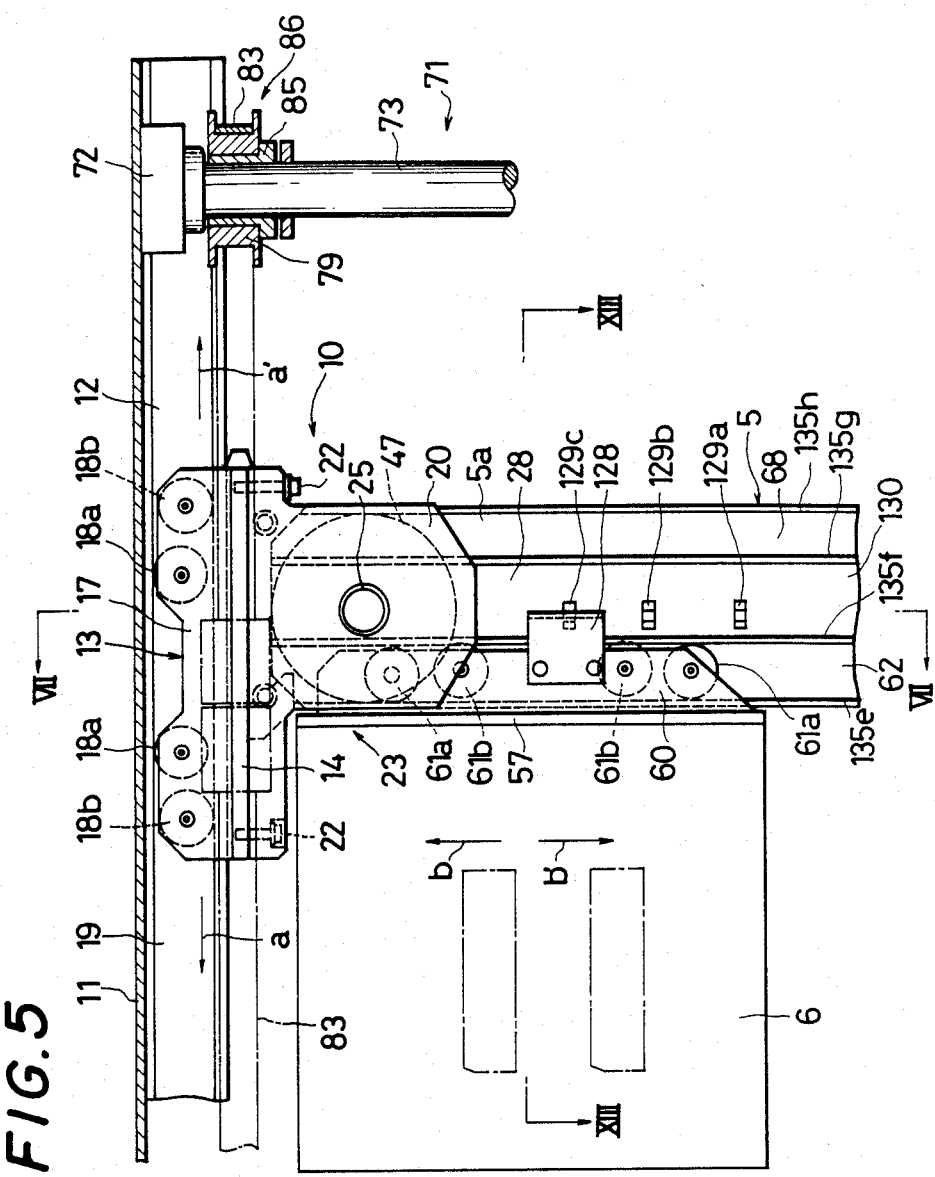
FIG. 5 is an enlarged, fragmentary front elevational view of the upper end portion of the vertical guide rail and of the mechanism for movably mounting the same on a fixed upper guide rail of the apparatus.
Figure 6:
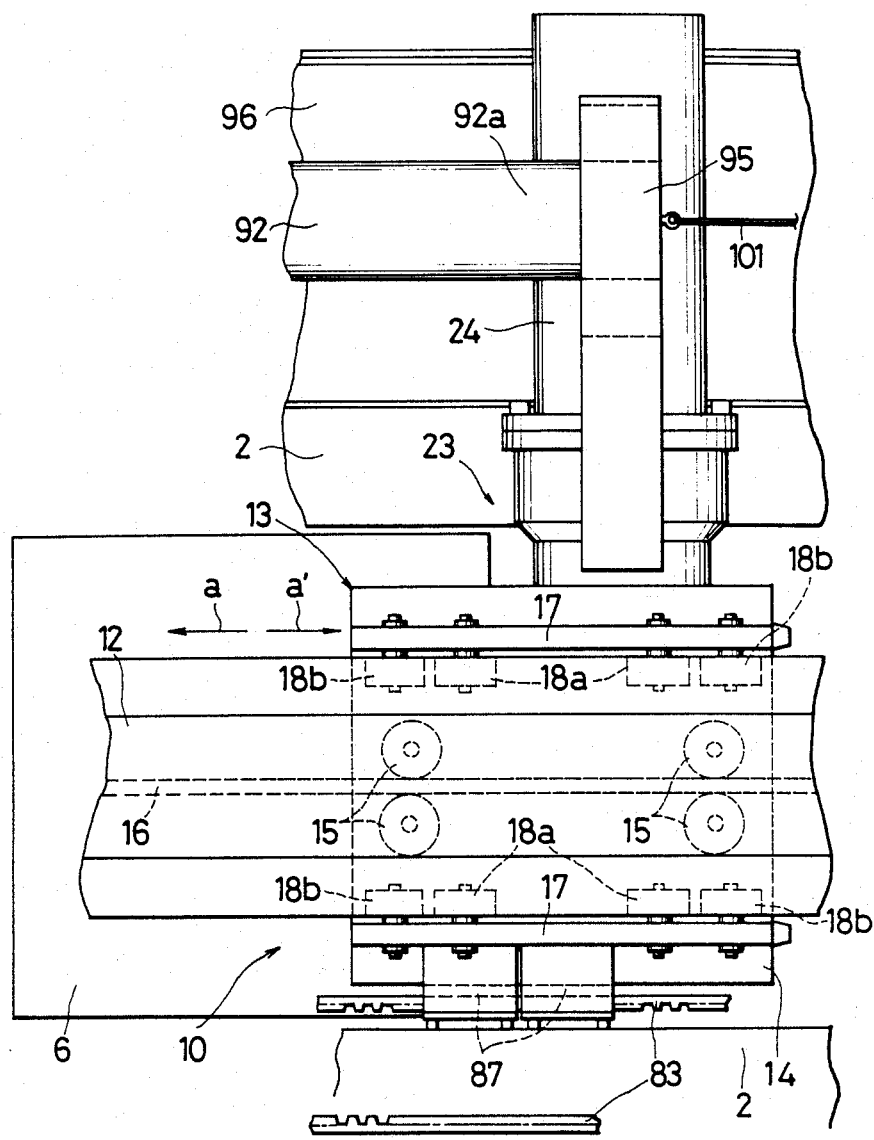
FIG. 6 is a fragmentary top plan view of the mechanism shown on FIG. 5.

A horizontal drive mechanism 71 is provided to effect movements of vertical guide rail 5 in the horizontal directions of arrows a and a'. As shown in FIGS. 5 and 10, such horizontal drive mechanism 71 includes a vertical shaft 73 rotatably mounted, at its upper and lower ends, in bearings 72 fixed to the top and bottom plates 11 and 38 of housing 1 adjacent the side of the latter remote from the stacked VTRs 4. A toothed driven pulley 74 is fixed to the lower end of shaft 73 and is engaged by a timing belt 78 which extends around a toothed driving pulley 77 fixed on a driving shaft 76 of a drive motor 75 mounted on bottom plate 38 (FIG. 3). A pair of upper and lower toothed driving pulleys 79 and 80 are mounted on upper and lower portions of shaft 73. Upper and lower toothed driven pulleys 81 and 82 (FIGS. 1 and 2) are mounted on top and bottom plates 11 and 38 for rotation about vertical axes adjacent the side of frame or housing 1 near the stack of VTRs 4. An upper timing belt 83 runs around driving pulley 79 and driven pulley 81 and a lower timing belt 84 runs around driving pulley 80 and driven pulley 82. The toothed driving pulleys 79 and 80 are adjustably secured to shaft 73 by releasable friction couplings 85 which constitute upper and lower drive synchronizing means 86. In other words, the rotational positions of upper and lower driving pulleys 79 and 80 can be adjusted relative to each other for a purpose hereinafter described in detail.

Figure 7:
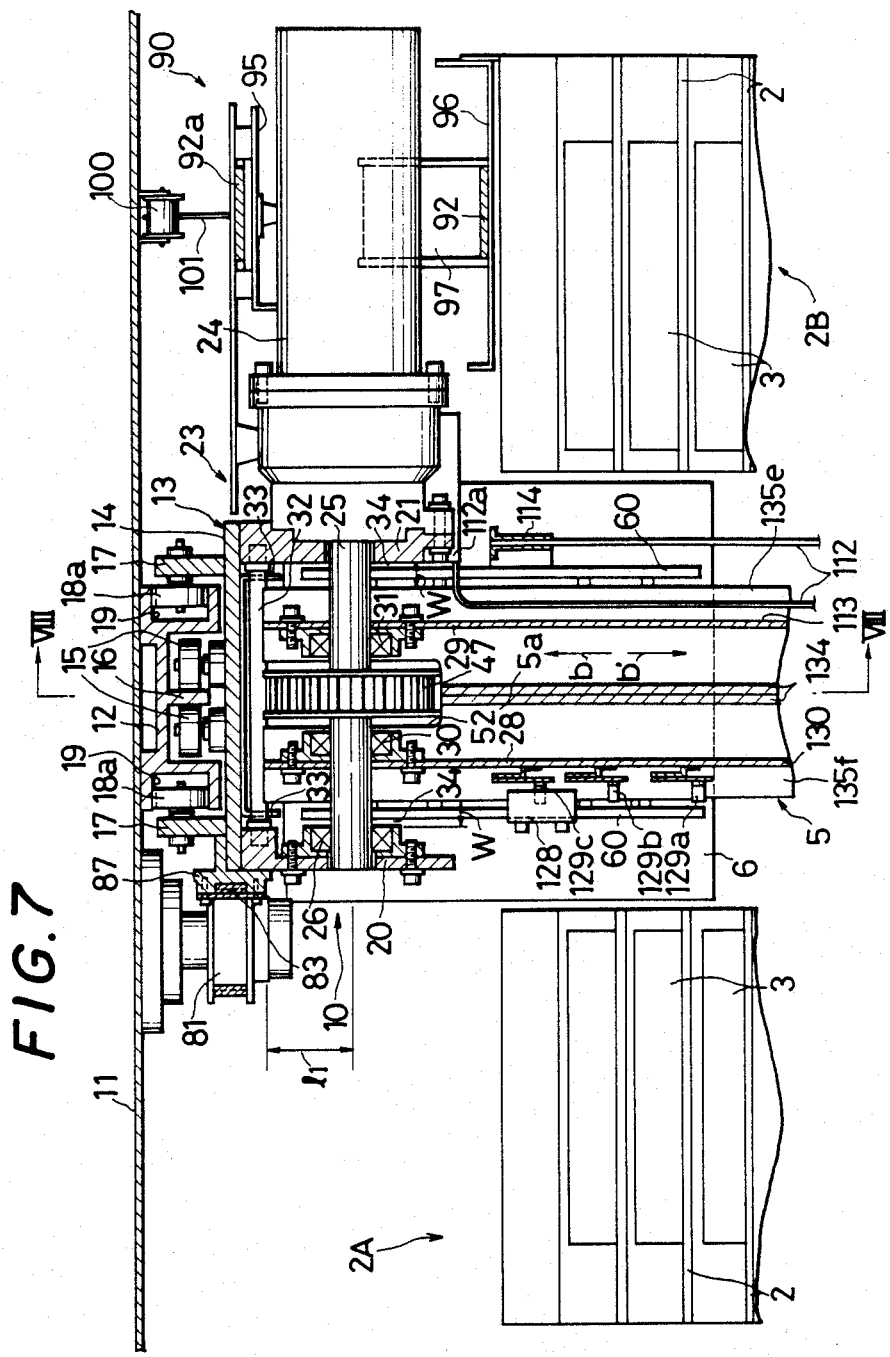
FIG. 7 is a sectional view taken along the line VII—VII on FIG. 5.

As shown in FIGS. 7 and 11, a belt clamp 87 secures a run of upper timing belt 83 to plate 14 of upper slider mechanism 13, and a belt clamp 88 similarly secures a run of the lower timing belt 84 to plate 41 of lower slider mechanism 40.

The operations of the horizontal drive mechanism 71 and the vertical drive mechanism 23 in effecting selected horizontal and vertical movements of cassette feeder or carriage 6 will now be described.

Upon forward or reverse rotation of drive motor 75, shaft 73 is suitably driven through toothed pulleys 74 and 77 and timing belt 78. The upper and lower driving pulleys 79 and 80 are rotated with shaft 73 with the result that the upper and lower timing belts 83 and 84 are driven for moving slider mechanisms 13 and 40 in the direction of the arrow a or a' along the respective upper and lower guide rails 12 and 39. The vertical guide rail 5, in being connected to the upper and lower slider mechanisms 13 and 40 at shafts 25 and 45, is similarly moved in the direction of the arrow a or a'. The movement of vertical guide rail 5, and hence of the carriage 6 thereon, in the direction of the arrow a or a' may be limited in response to the detection of a shutter plate 126 (FIG. 11) depending from the lower end of vertical guide rail 5 by suitable sensors 127 fixed along the lower horizontal guide rail 39.

Upon the forward or reverse rotation of drive motor 24, driving pulley 47 is similarly rotated to drive timing belt 49 with the result that cassette feeder or carriage 6 secured to a run of belt 49 by clamp 63 is moved vertically along guide rail 5 in the direction of the arrow b or b'. At the same time, counter weight 64 is moved vertically along guide rail 5 in the direction opposed to the movement of carriage 6 and balances the weight thereof. The vertical movements of cassette feeder or carriage 6 along guide rail 5 may be limited in response to the detection of a shutter plate 128 fixed to one of the flanges 60 on mounting plate 57 by a plurality of sensors 129a to 129e (FIGS. 5 and 10) secured to the front wall 28 of guide rail 5 within a groove 130 defined between ribs 135f and 135g.

The upper sensors 129a, 129b and 129c arranged in succession on the upper portion of guide rail 5 (FIG. 5) are successively encountered by shutter plate 128 as carriage 6 nears the upper limit of its vertical movement. For example, the detection of shutter 128 by sensor 129a may signal that deceleration of the upward movement of carriage 6 is to be commenced, while the detection of shutter plate 128 by sensor 129c signals the upper limit of the permissible travel of carriage 6 and causes cessation of the upward movement. The intermediate sensor 129b detects shutter plate 128 for establishing a so-called "origin" for the vertical movement of carriage 6, that is, a point at which the positional relationship of carriage 6 to the several bins 2 is predetermined. The lower sensors 129d and 129e (FIG. 10) cooperate with shutter plate 128 for indicating respective positions at which deceleration of the downward movement of carriage 6 should commence and at which the downward movement of the carriage should cease.

It will be appreciated that, when the described video cassette auto-changer is designed to accommodate hundreds of cassettes 3 in the bins 2, as is intended, the apparatus becomes rather large, and carriage 6 has to be moved over large distances in both the vertical and horizontal directions. Thus, the horizontal upper and lower guide rails 12 and 39 and the respective upper and lower plates 11 and 38 of housing 1 are long and may not be precisely parallel to each other. By reason of the pivotal suspension of vertical guide rail 5 from slider mechanism 13 at shaft 25, even when guide rail 12 is slightly inclined so as to similarly incline slider mechanism 13 moving therealong, guide rail 5 may remain vertical during its movement in the direction of the arrow a or a' for ensuring that the cassette feeder or carriage 6 will properly register with the bins 2 if the latter remain horizontal. It should be understood that, by rotationally adjusting the upper and lower driving pulleys 79 and 80 relative to each other on shaft 73, as is possible by reason of the releasable friction couplings 85 which constitute the drive synchronizing means 86, guide rail 5 can be made to swing a small distance about the pivoting axis of shaft 25 in the direction of the arrow c or c' on FIG. 10 relative to slider mechanism 13 so as to suitably angle or incline guide rail 5 for ensuring that the carriage 6 thereon will be properly aligned with the various bins 2 in the event that the latter are not precisely horizontal. Such adjustments for ensuring proper alignment of carriage 6 with the several bins 2 in an apparatus of large size are made possible by the pivotal connection of vertical guide rail 5 to upper slider mechanism 13 at shaft 25, and further by the fact that the lower slider mechanism 40 can move up and down relative to lower guide rail 39. Thus, inclination of guide rail 5 from the vertical, or in respect to a perpendicular to the direction along upper guide rail 12 is not accompanied by longitudinal stressing of guide rail 5 or by jamming of slider member 13 on guide rail 12.

Further, since shaft 25 of motor 24 is used for pivotally suspending guide rail 5 from slider mechanism 13, the pivotal suspension of guide rail 5 is simplified, that is, a pivot pin is not required just for that purpose. Moreover, by reason of the gaps or spaces 34 between guide rail 5 and support plates 20 and 21 of slider mechanism 13, the vertical flanges 60 extending from mounting plate 57 of cassette feeder or carriage 6 can extend into such spaces 34 at the upper limit of the vertical movement of carriage 6, thereby increasing the permissible range of vertical movement of carriage 6.

Figure 14:
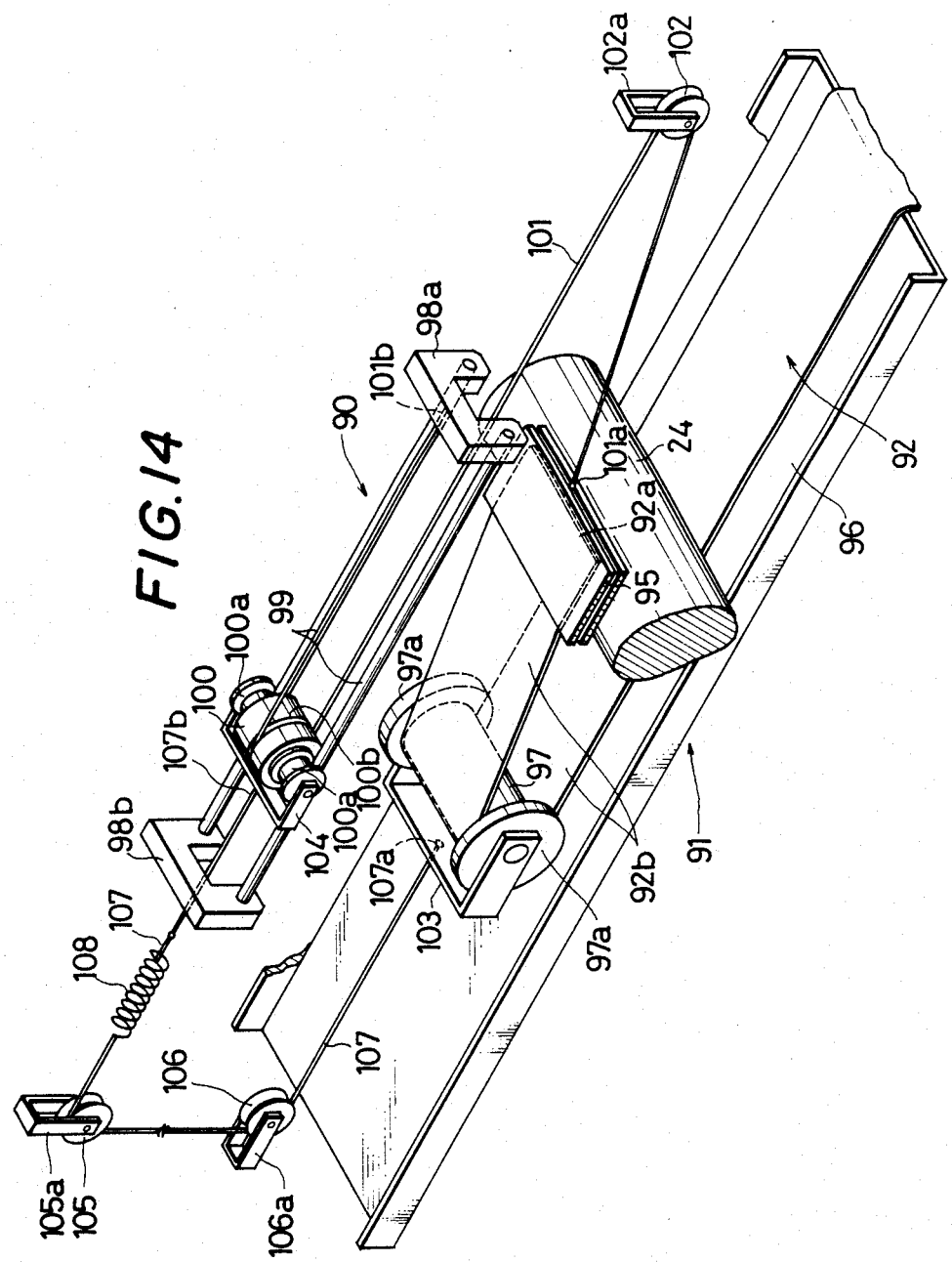
FIG. 14 is a perspective view of a mechanism provided in the apparatus embodying the invention for taking-up the slack in an elongated, flexible electrical connecting member through which electrical control and/or drive signals are transmitted during movements of a cassette transporting device horizontal distances.

Referring now to FIGS. 1–3,7 and 14, it will be seen that the illustrated video cassette auto-changer according to the invention is further provided with a mechanism 90 for avoiding slackness in an elongated flexible electrical connecting member 92, for example, in the form of a flat, flexible electric cable, for supplying electrical control or drive signals to the drive motor 24 of vertical drive mechanism 23 and to the cassette feeder or carriage 6, and which is of relatively great length for accommodating the large horizontal movements encountered in an apparatus of the described type. More particularly, in the illustrated embodiment, the flexible electrical connecting member 92 is guided upward along a side plate 94 of housing 1 from a fixed power source 93 (FIGS. 1 and 3) located within the lower portion of housing 1 at the side remote from the stacked VTRs 4. As shown in FIGS. 7 and 14, a horizontal guide shelf 96 extends laterally above the rear bank 2B of bins 2. After traveling upwardly along side plate 94 from power source 93, flexible electrical connecting member 92 is bent to extend along shelf 96, with the end 92a of connecting member 92 remote from power source 93 being connected to a base or receptacle 95 provided at the top of drive motor 24. The length of electrical connecting member 92 is at least sufficient to permit the full range of the required movements of motor 24 with upper slider mechanism 13 along horizontal guide rail 12. Of course, the vertical guide rail 5 suspended from slider mechanism 13 and the cassette feeder 6 movable vertically on vertical guide rail 5 are all movable with slider mechanism 13 and motor 24 in the horizontal directions, and, for the sake of convenience, are hereinafter all referred to, in the aggregate, as a movable member 91.

Figure 15:
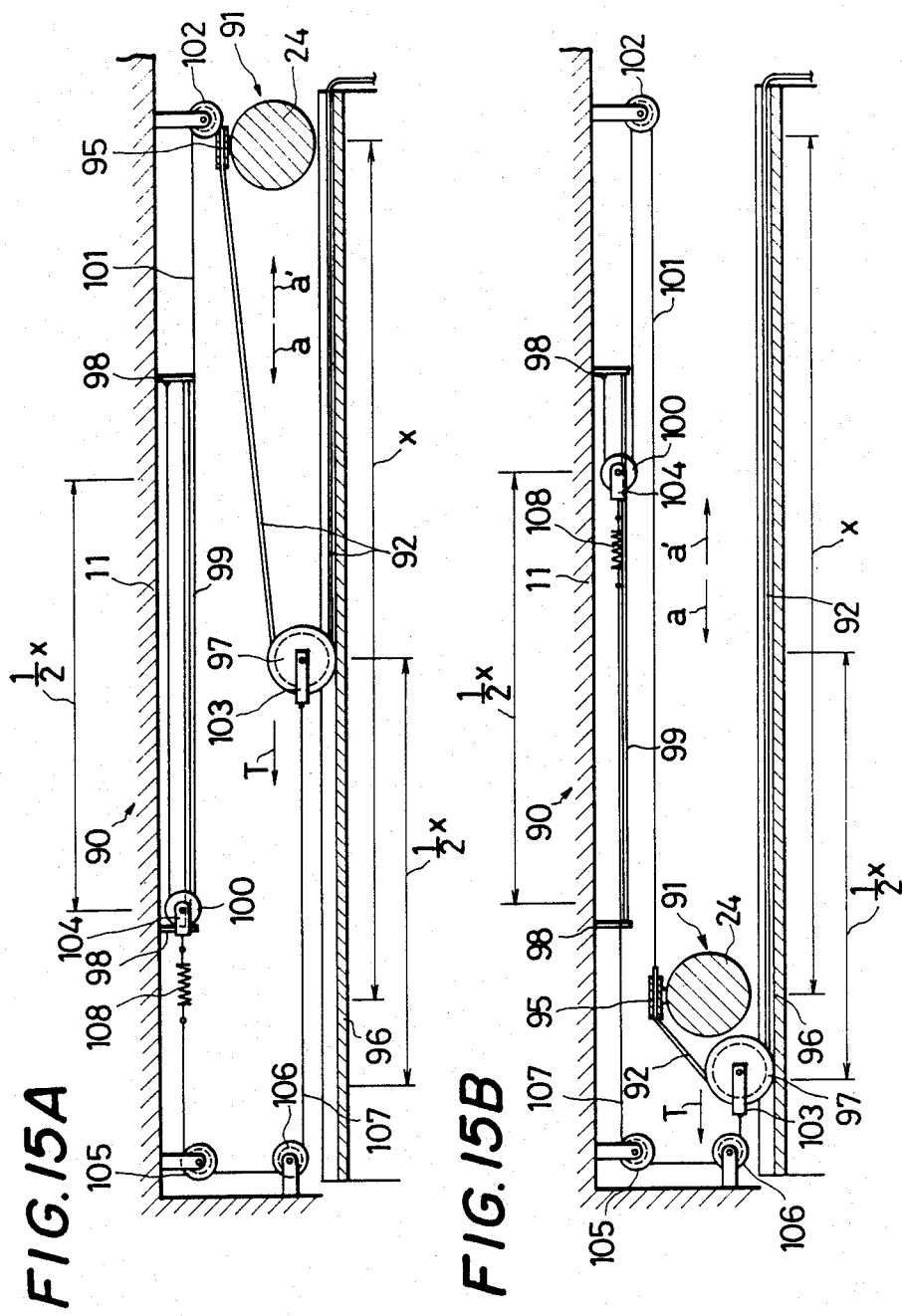
FIGS. 15A and 15B are diagrammatic views illustrating the mechanism of FIG. 14 in two different extreme positions thereof, and to which reference will be made in explaining the operation of such mechanism in accordance with this invention.

As shown particularly in FIGS. 14,15A and 15B, the electrical connecting member 92 extending along shelf 96 is turned upwardly and around a first movable roller 97 which has enlarged end flanges 97a in rolling contact with shelf 96. It will be seen that the portions 92b of electrical connecting member 92 extending to and from movable roller 97 form a bight in electrical connecting member 92. A pair of parallel guide rods 99 are disposed above shelf 96 and are supported, at their opposite ends, in brackets 98 depending from upper plate 11 of housing 1 so as to extend parallel to the direction of the horizontal rolling movements of first movable roller 97 on shelf 96. A second movable roller 100 has circumferential grooves 100a in its opposite end portions which receive guide rods 99 so that the second movable roller 100 can move by rolling along guide rods 99 in a path perpendicular to the axis of roller 100, and more particularly in a horizontal path parallel to the path of movement of the first movable roller 97 on shelf 96. A first elongated, flexible mechanical connection, for example, in the form of a wire 101, is connected at one end 101a to the base 95 on motor 24, and hence to the upper slider mechanism 13, while the other end 101b of wire 101 is connected to a fixed anchor, for example, to one of the fixed brackets 98. The wire 101 extends from its end 101a connected to base 95 around a pulley 102 rotatable in a suitably fixed bracket 102a, and then wire 101 extends around movable roller 100 in a guide groove 100b at the middle thereof, prior to being anchored at end 101b in bracket 98a. A second elongated, flexible mechanical connection, for example, in the form of a wire 107, extends between the first and second movable rollers 97 and 100. More specifically, as shown, one end 107a of wire 107 is connected to a yoke 103 in which roller 97 is rotatably mounted, while the other end 107a of wire 107 is connected to a yoke 104 in which roller 100 is rotatably mounted. Further, intermediate its ends, wire 107 extends around guide pulleys 105 and 106 that are rotatable in suitably mounted fixed brackets 105a and 106, respectively. A tension spring 108 is interposed in wire 107 and is initially stressed to exert a biasing force by which the first and second movable rollers 97 and 100 are urged along guide shelf 96 and guide shafts 99, respectively, in the direction of the arrow a on FIGS. 15A and 15B. The bight of electrical connecting member or flat cable 92 is thus pulled by roller 97 in the direction of the arrow a, thereby to avoid slack in cable 92. Due to the mechanical connection provided by wire 101 extending from movable member 91, that is, upper slider mechanism 13 and the components movable therewith, around fixed roller 102 and then movable roller 100 to the fixed anchor at end 101b, when movable member 91 is moved laterally in the direction of the arrow a or a', the second movable roller 100 is moved laterally in the opposite direction, that is, in the direction of the arrow a' or the arrow a, respectively.

It will be seen that, when movable member 91 is moved by horizontal drive mechanism 71 through a distance x in the direction of the arrow a, for example, from the position shown on FIG. 15A to the position shown on FIG. 15B, the end 101a of wire 101 fixed to movable member 91 is also moved by the distance x. However, since wire 101 extends around second movable roller 100, that is, a bight is formed in wire 101, the second movable roller 100 is only moved through a distance ½ x in the direction of the arrow a'. In response to such movement of second movable roller 100, wire 107 pulls first movable roller 97 in the direction of the arrow a through a distance of ½ x, for example, from the position shown on FIG. 15A to the position shown on FIG. 15B. Since the electrical connecting member or cable 92 extends around movable roller 97, and thus has a bight formed therein, the movement of roller 97 in the direction of the arrow a through the distance ½x is equivalent to the movement of movable member 91 in the same direction, that is, in the direction of the arrow a, through the distance x. Furthermore, since the first and second movable rollers 97 and 100 move through the same distances, spring 108 interposed in wire 107 between rollers 97 and 100 maintains a predetermined tension. In other words, regardless of the position of movable member 91, a predetermined tension T is maintained in electrical connecting member or cable 92 as a result of spring 108 and slack in connecting member 92 is avoided. Even if the distance over which movable member 91 is to be moved in the horizontal direction is very large, the total space required for accommodating cable 92 and the mechanism 90 for avoiding slack therein is minimized by the fact that rollers 97 and 100 are moved through distances that are only ½ the distances through which member 91 is moved. Further, since a predetermined tension T is always maintained in connecting member or cable 92, the response of the latter to movements of the movable member 91 is immediate and precise.

The flexible electrical connecting member or cable 92 extending from fixed source 93 to the terminal or connecting block 95 on drive motor 24 is, of course, suitable for transmitting electrical driving and control signals for motor 24, and also for the cassette feeder or carriage 6. However, since carriage 6 is movable vertically on guide rail 5, an additional flexible electrical connecting member 112, for example, in the form of a flexible, flat cable, is required for further transmitting those electrical driving and control signals required for the operations of carriage 6. As shown particularly on FIG. 7, flexible flat cable 112 extends from a terminal or connecting block 112a at the lower portion of drive motor 24 and extends vertically downward in a guide groove 113 defined between vertical ribs 135b and 135c projecting from the rear wall 29 of guide rail 5. The end portion of flexible flat cable 112 remote from connecting block 112a is engaged with a suitable terminal or connecting block 114 on cassette feeder or carriage 6. The length of flat cable 112 is, of course, sufficient to accommodate the full range of the possible movements of carriage 6 vertically along guide rail 5. Since such movements of carriage 6 along guide rail 5 may be relatively large, the video cassette auto-changer according to this invention further comprises a mechanism 111 for avoiding slackness in the elongated flexible cable 112 required for accommodating such movements while supplying electrical control or driving signals from the connecting block 112a at motor 24 to the connecting block 114 at carriage 6.

Figure 16:
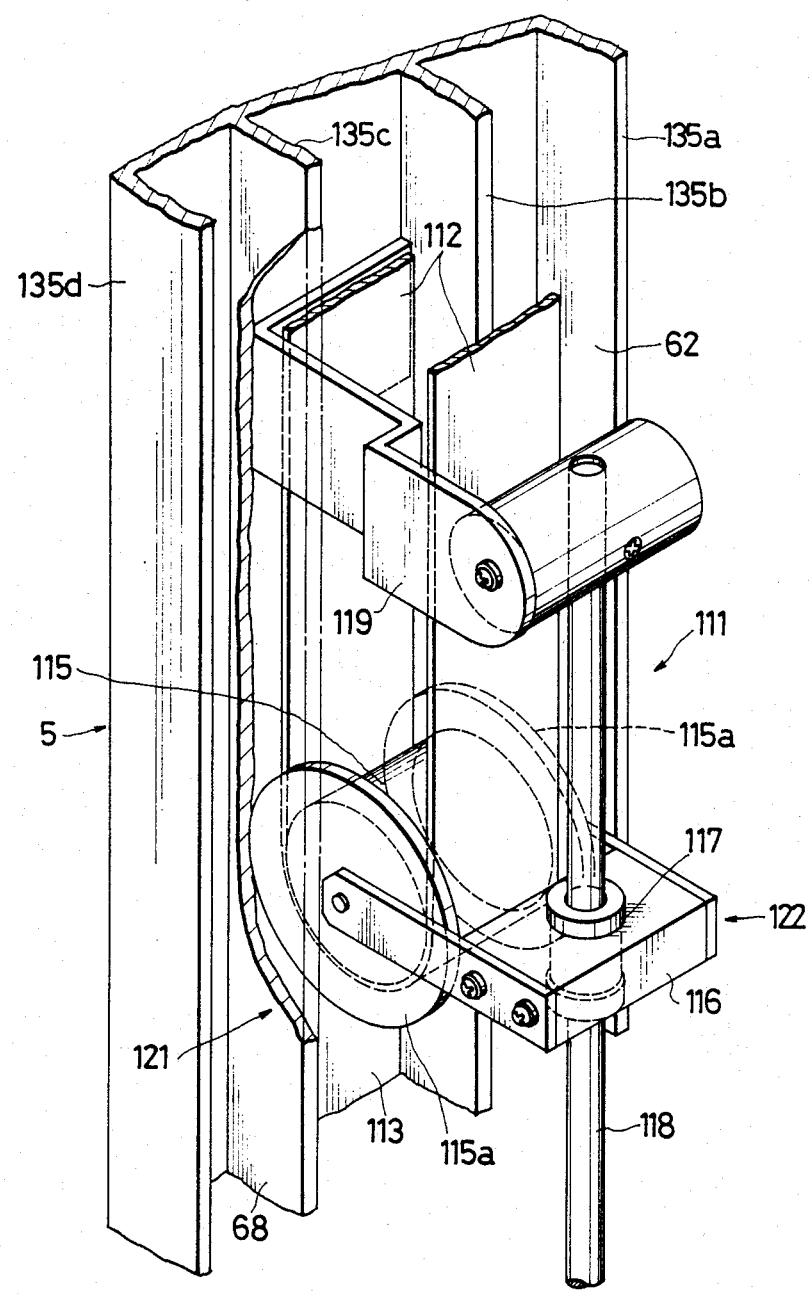
FIG. 16 is a fragmentary perspective view of a mechanism provided the apparatus embodying the invention for taking-up slack in an elongated flexible electrical connecting member through which electrical control signals are supplied to the carriages while permitting vertical movements of the latter on the vertical guide rail.

As shown on FIG. 16, the mechanism 111 includes a roller 115 under which the elongated flat cable 112 is looped, and having flanges 115a at its opposite ends which extend into and are guided along the vertical groove 113 in guide rail 5. Thus, groove 113 in guide rail 5 forms a first guide means 121 for roller 115. A second guide means 22 for roller 115 is constituted by a yoke 116 having roller 115 rotatably mounted therein and containing a linear bearing 117 slidably receiving a vertical guide rod 118. The upper end of guide rod 118 is secured in a support bracket 119 fixed to guide rail 5 approximately midway between the upper and lower ends of the latter. The lower end of guide rod 118 is supported in a bracket 120 fixed to the lower end portion of guide rail 5. Therefore, roller 115 is free to move vertically along the lower half of guide rail 5 while the weight W of roller 115 acts in the bight of flat cable 112 for avoiding slack in the latter. During vertical movements of roller 115, lateral displacements thereof are prevented by the engagement of roller 115 in groove 113 at the back of guide rail 5, while forward and rearward displacements of roller 115 are prevented by the engagement of guide rod 18 in linear bearing 117.

Figure 17A:
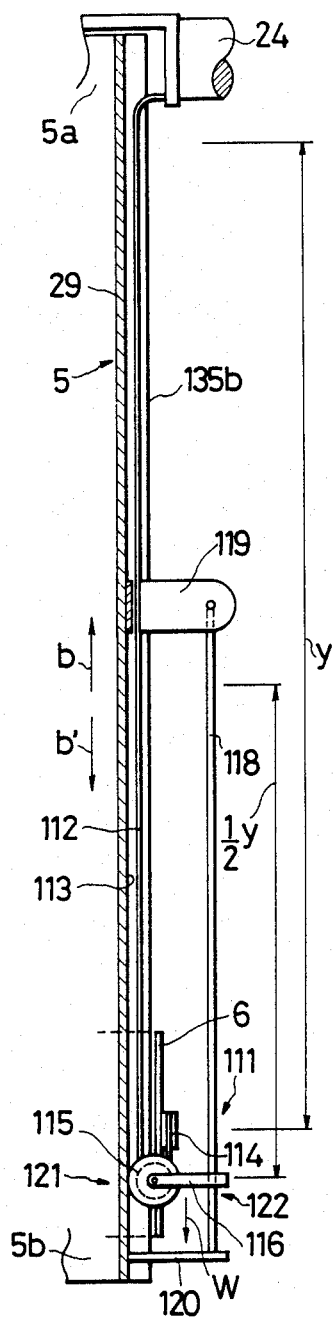
FIGS. 17A and 17B are diagrammatic side elevational views representing the mechanism of FIG. 16 in two different extreme positions thereof, and to which reference will be made in explaining the operation of such mechanism.
Figure 17B:
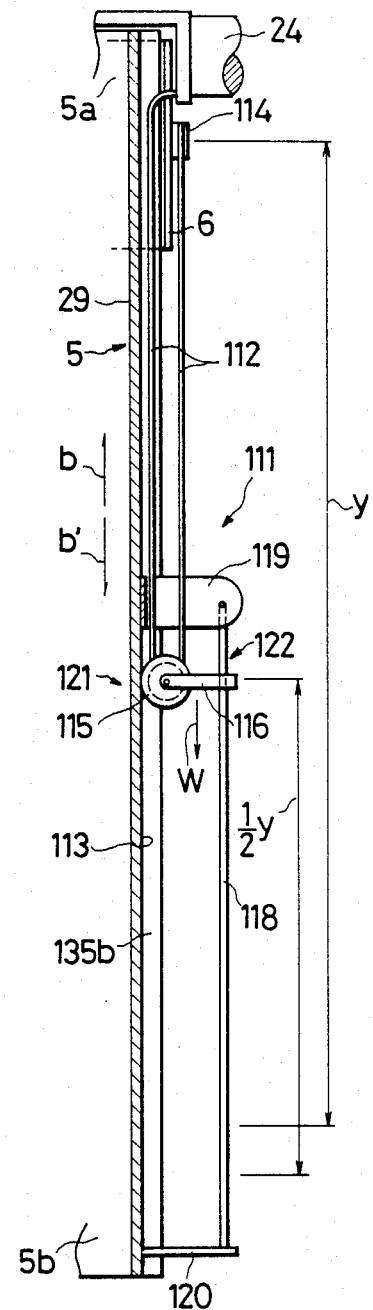

As shown in FIGS. 17A and 17B, when cassette feeder or carriage 6 is moved vertically in the direction of arrow b' through a distance y, for example, from the position shown on FIG. 17B to the position shown on FIG. 17A, movable roller 115 engaging flexible cable 112 moves in the same direction of arrow b', but through distance y/2, that is, a distance that is ½ the displacement of the carriage 6. At all such times, flexible cable 112 is maintained under tension by the weight W of roller 115 which, as described, moves through relatively small distances for minimizing the space required therefor even when carriage 6 undergoes large vertical movements. Since movable roller 115 is closely guided by vertical guide groove 113 and vertical guide shaft 118 during its vertical movements, the interference of movable roller 115 with other structural or operating members of the apparatus is avoided. Thus, for example, the banks 2A and 2B of cassette storage bins 2 can be located very close to vertical guide rail 5, as shown on FIG. 3.

As earlier noted with reference to FIGS. 12 and 13, vertical guide rail 5 is desirably formed in two parts which can be each conveniently extruded from aluminum and then joined by screws 134a. The various ribs identified previously as defining the guide grooves 59,62,66,68 and 113 for vertically guiding the cassette feeder or carriage 6, the counter weight 64, and the movable roller 115, as well as for defining the groove 130 in which the sensors 129a–129e are conveniently located, can be conveniently formed during extrusion of the parts of guide rail 5. Thus, vertical guide rail 5 is easily formed to serve a number of functions in a compact form.

It is also to be seen that, by reason of the two-part structure of vertical guide rail 5, driving pulley 47 and driven pulley 48 can be disposed within the structure of guide rail 5 without unduly complicating the assembling of the latter. In other words, the upper and lower ends of vertical guide rail 5 car extend the distances $l_1$ and $l_2$ (FIGS. 7 and 11) beyond the axes of shafts 25 and 54, respectively and, as a result thereof, the vertical range of movements of cassette feeder or carriage 6 along guide rail 5 can be increased for a particular length of that guide rail. Further, when guide rail 5 is extruded of aluminum, a lightweight structure is achieved and, if guide rollers 58,61a, 61b, 65,67a and 67b for the cassette feeder or carriage 6 and the counter weight 64 are formed of urethane or other suitable synthetic resin or plastic material, substantially noise-free operation can be achieved.

By way of summary, it will be apparent that the described apparatus according to this invention permits movements of the cassette feeder or carriage 6 over large vertical and horizontal distances while ensuring that such movements will be smoothly effected so that jamming is avoided. Further, in the course of such large horizontal and vertical movements, the electrical connecting members or cables for transmitting electrical control and/or driving signals from a fixed source to various movable elements of the apparatus, for example, to motor 24 and then on to carriage 6, are maintained under predetermined tensions for avoiding slackness and possible entanglement in other structures of the apparatus.

Although the invention has been specifically described in its application to a video cassette auto-changer, it will be appreciated that the invention can be similarly applied to other devices for feeding or storing different kinds of cassettes or cartridges containing tapes, disks or the like.

Having specifically described a preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In an apparatus for selectively supplying and reproducing cassettes and which includes a plurality of reproducing and/or recording means, a plurality of cassette storage bins arrayed in first and second orthogonally related directions and each adapted to store a cassette therein, and cassette transporting means for selectively transporting cassettes between said storage bins and between said storage bins and said reproducing and/or recording means; said cassette transporting means comprises:

first fixed guide rail means extending longitudinally in said first direction;
slider means slidably mounted on said first guide rail means for movement along the latter in said first direction;
slider driving means for driving said slider means along said first fixed guide rail means;
movable guide rail means extending longitudinally in said second direction;
connecting means pivotally connecting one end of said movable guide rail means to said slider means for movement with the latter along said first fixed guide rail means and for pivoting in respect to said slider means about a pivot axis perpendicular to a plane containing said first and second orthogonally related directions;
second fixed guide rail means extending substantially parallel with, and spaced from said first fixed guide rail means with said movable guide rail means extending between said first and second fixed guide rail means;
cooperating means on said second fixed guide rail means and the other end of said movable guide rail means for limiting movements of the latter only in directions parallel to said pivot axis;
carriage means mounted on said movable guide rail means for movement along the latter in said second direction and being adapted to receive a cassette from, and to discharge a cassette into a selected one of said storage bins or said reproducing and/or recording means with which said carriage means is registered; and
carriage driving means for driving said carriage along said movable guide rail means so that, by the combined selective operations of said slider driving means and said carriage driving means, said carriage means can be registered with said selected one of the storage bins and the reproducing and/or recording means.

2. An apparatus according to claim 1; in which said carriage driving means includes an electric motor mounted on said slider means and having a motor shaft defining said pivot axis.

3. An apparatus according to claim 2; in which said carriage driving means further includes a first pulley rotatably coupled with said motor shaft, a second pulley rotatably mounted on said movable guide rail means adjacent said other end thereof, and a carriage drive belt running around said first and second pulley and having a run therebetween secured to said carriage means.

4. An apparatus according to claim 3; in which said slider driving means includes a first pair of pulleys respectively mounted rotatably at opposite ends of said first fixed guide rail means, a first slider driving belt running around said first pair of pulleys and having a run therebetween secured to said slider means, a second pair of pulleys respectively mounted rotatably at opposite ends of said second fixed guide rail means, a second slider driving belt running around said second pair of pulleys and having a run therebetween, means connecting said run of the second slider driving belt to said other end of the movable guide rail means, a drive shaft extending between said first and second fixed guide rail means at one end of the fixed guide rail means, means rotatably coupling said drive shaft to the pulleys of said first and second pairs of pulleys located at said one end of the fixed guide rail means, and electric motor means for driving said drive shaft.

5. An apparatus according to claim 4; in which said first and second fixed guide rail means extend substantially horizontally and are vertically spaced apart with said movable guide rail means extending substantially vertically therebetween.

6. An apparatus according to claim 5; in which said first fixed guide rail means is at the upper end of said movable guide rail means, said first fixed guide rail means and slider means have cooperating means limiting relative movement thereof in the vertical direction and in a horizontal direction perpendicular to said first direction, and said cooperating means on said second fixed guide rail and said other end of the movable guide rail means limit relative movements thereof in said horizontal direction perpendicular to said first direction while permitting relative vertical movements.

7. An apparatus according to claim 6; in which said means rotatably coupling said drive shaft to said pulleys of the first and second pairs of pulleys at said one end of the fixed guide rail means includes means of individually adjusting said pulleys at said one end of the fixed guide rail means rotationally in respect to said drive shaft for accommodating inclination from the vertical by said movable guide rail means.

8. An apparatus according to claim 1; in which said first and second fixed guide rail means extend substantially horizontally and are vertically spaced apart with said movable guide rail means extending substantially vertically therebetween.

9. An apparatus according to claim 8; in which said first fixed guide rail means is at the upper end of said movable guide rail means, said first fixed guide rail means and slider means have cooperating means limiting relative movements thereof in the vertical direction and in a horizontal direction perpendicular to said first direction, and said cooperating means on said second fixed guide rail means and the other end of said movable guide rail means limit relative movements thereof in said horizontal direction perpendicular to said first direction while permitting relative vertical movements.

10. In an apparatus for selectively supplying and reproducing cassettes and which includes a plurality of reproducing and/or recording means, a plurality of cassette storage bins arrayed in first and second orthogonally related directions and each adapted to store a cassette therein, and cassette transporting means for selectively transporting cassettes between said storage bins and between said storage bins and said reproducing and/or recording means, said cassette transporting means comprising:

fixed guide rail means extending in said first direction;
slider means mounted on said fixed guide rail means for movement along the latter in said first direction;
slider driving means for driving said slider means along said fixed guide rail means;
movable guide rail means extending in said second direction;
connecting means pivotally connecting said movable guide rail means to said slider means for movement with the latter along said fixed guide rail means and for pivoting in respect to said slider means about a pivot axis perpendicular to a plane containing said first and second orthogonally related directions;

carriage means mounted on said movable guide rail means for movement along the latter in said second direction and being adapted to receive a cassette from, and to discharge a cassette into a selected one of said storage bins or said reproducing and/or recording means with which said carriage means is registered;

carriage driving means including motor means mounted on said slider means for driving said carriage along said movable guide rail means so that, by the combined selective operations of said slider driving means and said carriage driving means, said carriage means can be registered with said selected one of the storage bins and the reproducing and/or recording means;

an elongated, flexible electrical connecting member extending from a fixed source of electrical control signals to said motor means and being of a length to permit movement of said motor means with said slider means in said first direction along said fixed guide rail means;

first movable roller means around which said electrical connecting member extends to form a bight in the latter;

means mounting said first movable roller means for movements in said first direction;

second movable roller means mounted for reciprocal movements in a path perpendicular to the axis of said second roller means;

a first elongated, flexible mechanical connection connected at one end to said slider means and at its other end to a stationary anchor, said first mechanical connection extending around said second movable roller means for moving the latter in said path in response to movements of said slider means in said first direction; and a second elongated, flexible mechanical connection extending between said first and second movable roller means for moving said first roller means in said first direction in response to movements of said second roller means in said path so as to avoid slackness in said bight of the electrical connecting member.

11. An apparatus according to claim 10; in which a tension spring is interposed in said second mechanical connection for maintaining a predetermined tension in said electrical connecting member.

12. An apparatus according to claim 10; in which said path of movement of said second roller means is parallel to said first direction and a bight is also formed in said first mechanical connection in extending around said second roller means so that, upon movement of said slider means in said first direction, said first and second roller means are each moved in said first direction through one-half of said movement of the slider means for avoiding said slackness of the electrical connecting member.

13. An apparatus according to claim 10; in which said fixed guide rail means includes horizontally extending upper and lower fixed guide rails which are vertically spaced apart, said slider means includes upper and lower slider members movable along said upper and lower fixed guide rails, respectively, and said movable guide rail means extends vertically between said upper and lower slider members; and further comprising a second elongated flexible electrical connecting member extending from said upper slider member to said carriage means for supplying electrical control signals to the latter and having a length sufficient to accommodate said movement of the carriage means along said movable guide rail means, a third movable roller means under which said second electrical connecting member extends for forming a bight in the latter, and means guiding said third movable roller means for movements along said movable guide rail means under the influence of gravity so that the weight of said third movable roller means acts to take up slack in said second electrical connecting member.

14. In an apparatus for selectively supplying and reproducing cassettes and which includes a plurality of reproducing and/or recording means, a plurality of cassette storage bins arrayed in horizontal and vertical directions and each adapted to store a cassette therein, and cassette transporting means for selectively transporting cassettes between said storage bins and between said storage bins and said reproducing and/or recording means; said cassette transporting means comprising:

fixed guide rail means including horizontally extending upper and lower fixed guide rails which are vertically spaced apart;

slider means including upper and lower slider members movable along said upper and lower fixed guide rails, respectively;

slider driving means for driving said slider members along the respective fixed guide rails;

movable guide rail means extending vertically between said upper and lower slider members;

connecting means pivotally connecting the upper end of said movable guide rail means to said upper slider member for movement with the latter along said upper fixed guide rail and for pivoting in respect to said upper slider member about a pivot axis perpendicular to a plane containing said horizontal and vertical directions;

carriage means mounted on said movable guide rail means for movement along the latter in said vertical direction and being adapted to receive a cassette from, and to discharge a cassette into a selected one of said storage bins or said reproducing and/or recording means with which said carriage means is registered;

carriage driving means for driving said carriage along said movable guide rail means so that, by the combined selective operations of said slider driving means and said carriage driving means, said carriage means can be registered with said selected one of the storage bins and the reproducing and/or recording means;

an elongated flexible electrical connecting member extending from said upper slider member to said carriage means for supplying electrical control signals to the latter and having a length sufficient to accommodate said movement of the carriage means along said movable guide rail means;

a movable roller means under which said electrical connecting member extends for forming a bight in the latter; and means guiding said movable roller means for movements along said movable guide rail means under the influence of gravity so that the weight of said movable roller means acts to take up slack in said electrical connecting member.

15. In an apparatus for selectively supplying and reproducing cassettes and which includes a plurality of reproducing and/or recording means, a plurality of cassette storage bins arrayed in first and second orthogonally related directions and each adapted to store a cassette therein, and cassette transporting means movable in said first and second directions for selectively transporting cassettes between said storage bins and between said storage bins and said reproducing and/or recording means; the combination comprising:

an elongated, flexible electrical connecting member extending from a fixed source of electrical control signals to said cassette transporting means and being of a length to permit movements of the latter in said first direction, first movable roller means around which said electrical connecting member extends to form a bight in the latter, means mounting said first movable roller means for movements in said first direction, second movable roller means mounted for reciprocal movements in a path perpendicular to the axis of said second roller means, a first elongated, flexible mechanical connection connected at one end to said cassette transporting means and at its other end to a stationary anchor, said first mechanical connection extending around said second movable roller means for moving the latter in said path in response to movements of said cassette transporting means in said first direction, and a second elongated, flexible mechanical connection extending between said first and second movable roller means for moving said first roller means in said first direction in response to movements of said second roller means in said path so as to avoid slackness in said bight of the electrical connecting member.

16. An apparatus according to claim 15; in which a tension spring is interposed in said second mechanical connection for maintaining a predetermined tension in said electrical connecting member.

17. An apparatus according to claim 15; in which said path of movement of said second roller means is parallel to said first direction and a bight is also formed in said first mechanical connection in extending around said second roller means so that, upon movement of said cassette transporting means in said first direction, said first and second roller means are each moved in said first direction through one-half of said movement of the cassette transporting means for avoiding said slackness of the electrical connecting member.

18. An apparatus according to claim 17; in which said first direction is horizontal.

19. In an apparatus for selectively supplying and reproducing cassettes and which includes a plurality of reproducing and/or recording means, a plurality of cassette storage bins arrayed in horizontal and vertical directions and each adapted to store a cassette therein, and cassette transporting means for selectively transporting cassettes between said storage bins and between said storage bins and said reproducing and/or recording means; said cassette transporting means comprising:

horizontally extending upper and lower fixed guide rails which are vertically spaced apart;
upper and lower slider members movable along said upper and lower fixed guide rails, respectively;
slider driving means for driving said upper and lower slider members along said fixed guide rails;
movable guide rail means extending vertically between said upper and lower slider members;
carriage means mounted on said movable guide rail means for vertical movement along the latter and being adapted to receive a cassette from, and to discharge a cassette into a selected one of said storage bins or said reproducing and/or recording means with which said carriage means is registered;
an elongated flexible electrical connecting member extending from said upper slider member to said carriage means for supplying electrical control signals to the latter and having a length sufficient to accommodate said movement of the carriage means along said movable guide rail means;
movable roller means under which said electrical connecting member extends for forming a bight in the latter; and
means guiding said movable roller means for movements along said movable guide rail means under the influence of gravity so that the weight of said movable roller means acts to take up slack in said electrical connecting member.

20. In an apparatus for selectively supplying and reproducing cassettes and which includes a plurality of reproducing and/or recording means, a plurality of cassette storage bins arrayed in horizontal and vertical directions and each adapted to store a cassette therein, and cassette transporting means for selectively transporting cassettes between said storage bins and said reproducing and/or recording means; said cassette transporting means comprising:

fixed guide rail means extending in said horizontal direction;
slider means slidably mounted on said fixed guide rail means for movement along the latter in said horizontal direction;
slider driving means for driving said slider means along said fixed guide rail means;
movable guide rail means extending in said vertical direction;
connection means pivotally connecting the upper end portion of said movable guide rail means to said slider means for movement with the latter along said fixed guide rail means and for pivoting with respect to said slider means about a pivot axis which is perpendicular to both said horizontal and vertical directions;
carriage means slidably mounted on said movable guide rail means for movement along the latter in said vertical direction and being adapted to receive a cassette from and to discharge a cassette into a selected one of said storage bins or said reproducing and/or recording means with which said carriage means is registered; and
carriage driving means for driving said carriage along said movable guide rail means so that, by the combined selective operations of said slider driving means and said carriage driving means, said carriage means can be registered with said selected one of the storage bins and the reproducing and/or recording means.

* * * * *